(12) United States Patent
Padaki et al.

(10) Patent No.: US 10,922,212 B2
(45) Date of Patent: Feb. 16, 2021

(54) SYSTEMS AND METHODS FOR SERVICE CATALOG ANALYSIS

(71) Applicant: ServiceNow, Inc., Santa Clara, CA (US)

(72) Inventors: Bharath Padaki, San Diego, CA (US); Shouvik Goswami, Telangana (IN); Parameswara Reddy Annapureddy, Andhra Pradesh (IN)

(73) Assignee: ServiceNow, Inc., Santa Clara, CA (US)

( * ) Notice: Subject to any disclaimer, the term of this patent is extended or adjusted under 35 U.S.C. 154(b) by 399 days.

(21) Appl. No.: 15/644,509

(22) Filed: Jul. 7, 2017

(65) Prior Publication Data

US 2018/0322027 A1 Nov. 8, 2018

(30) Foreign Application Priority Data

May 6, 2017 (IN) .............................. 201711016023

(51) Int. Cl.
| | | |
|---|---|---|
| *G06F 9/44* | (2018.01) | |
| *G06F 11/36* | (2006.01) | |
| *G06Q 30/06* | (2012.01) | |
| *G06F 8/65* | (2018.01) | |
| *G06F 9/445* | (2018.01) | |
| *G06F 8/71* | (2018.01) | |
| *G06F 9/50* | (2006.01) | |

(52) U.S. Cl.
CPC .............. *G06F 11/368* (2013.01); *G06F 8/65* (2013.01); *G06F 8/71* (2013.01); *G06F 9/44505* (2013.01); *G06F 9/50* (2013.01); *G06F 11/3672* (2013.01); *G06Q 30/0603* (2013.01)

(58) Field of Classification Search
None
See application file for complete search history.

(56) References Cited

U.S. PATENT DOCUMENTS

| | | | | |
|---|---|---|---|---|
| 6,810,494 B2* | 10/2004 | Weinberg | ............ | G06F 11/3688 714/32 |
| 8,607,203 B1* | 12/2013 | Mehra | ................. | G06F 11/3688 717/124 |
| 2006/0248401 A1* | 11/2006 | Carroll | ................ | G06F 11/3664 714/38.1 |
| 2015/0007150 A1* | 1/2015 | Anton | ................. | G06F 11/3466 717/132 |
| 2017/0147324 A1* | 5/2017 | Weber | ................. | G06F 11/3664 |

* cited by examiner

*Primary Examiner* — Qamrun Nahar
(74) *Attorney, Agent, or Firm* — Fletcher Yoder PC

(57) ABSTRACT

Systems, methods, and media for analyzing service catalog items include determining information about a service catalog item, such as whether the service catalog item functions as intended, has macros associated therewith that have changed due to a platform change of a platform running the service catalog, and determining a change has occurred to variables and the source of the change when variables associated with the service catalog item have changed.

19 Claims, 21 Drawing Sheets

SYSTEMS AND METHODS FOR SERVICE CATALOG ANALYSIS

CROSS-REFERENCE TO RELATED APPLICATION

This application claims priority to and the benefit of Indian Patent Application No. 201711016023, entitled "SYSTEMS AND METHODS FOR SERVICE CATALOG ANALYSIS", filed May 6, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources (e.g., configuration items) hosted in distributed computing (e.g., cloud-computing) environments may be disparately located with each having its own functions, properties, and/or permissions. Such resources may include hardware resources (e.g. computing devices, switches, etc.) and software resources (e.g. database applications, services). A service catalog may be used to organize, curate, and/or offer these resources.

BRIEF DESCRIPTION OF THE DRAWINGS

The description herein makes reference to the accompanying drawings, wherein like reference numerals refer to like parts throughout the several views.

DETAILED DESCRIPTION

Figure 1:
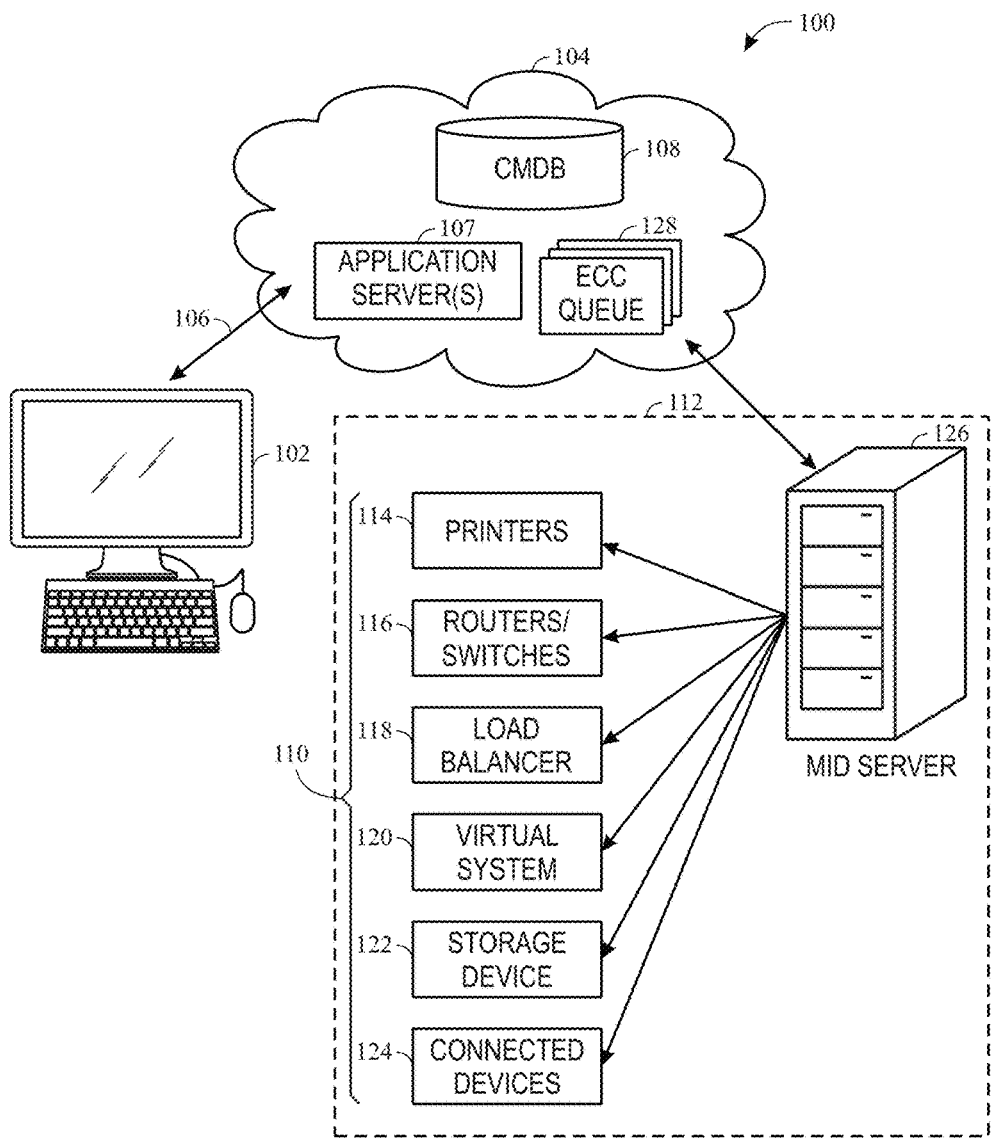
FIG. 1 is a block diagram of a distributed computing system utilizing a platform/cloud service, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed using services through some form of distributed computing, the complexity of IT network management increases. Indeed, the number of available services and/or CIs may be unwieldy.

A service catalog application is a way for customers to order pre-defined, bundled goods and services from an IT organization or other departments. The service catalog offers a consistent, intuitive, and flexible online ordering experience. The catalog is a structured commodity with its own description, fields, price, and execution schedule. Thus, through a service portal, end users may see all the goods and services available, such as a new laptop, an office desk, business cards, server space, email service, and/or any goods or services that may be used through an IT organization/department. These goods and services may be grouped into categories (e.g., IT, facilities, office and printing) and sub-categories (e.g., computer hardware, furniture and decor, document services).

Once an order is placed through the service catalog, the customer may track order progress against an execution plan. In some embodiments, completion of an order may wait until approved, when appropriate. Once the order is approved, it will be fulfilled as a ticket generated by the order.

Furthermore, the services available to end users may be centralized, organized, and curated via the service catalog that may also offer the various services to users for access. In other words, service catalogs may include knowledge management tools for the employees and consultants of an enterprise. The service catalog may enable routing of requests for the services and requests for information about the services. In other words, the service catalog may be used to utilize the services themselves through an integrated implementation model. Furthermore, by centralizing services into the service catalog, the service catalog can be used to determine gaps in coverage and/or redundancies in coverage. In some embodiments, service catalogs may further simplify operations by compartmentalizing the services into operational units.

Moreover, service catalog may be deployed in IT service environments, such as IT Service Management (ITSM). The service catalog may be governed by service level requirements in a service level agreement (SLA).

By way of introduction, FIG. 1 is a block diagram of a system 100 that utilizes distributed computing framework, which may perform one or more of the techniques described herein. As illustrated in FIG. 1, a client 102 communicates with a platform 104 (e.g., a cloud service) over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs (e.g., web browser) running on the computing devices. The client 102 may be implemented using a single physical unit or a combination of physical units (e.g., distributed computing) running one or more client application programs. Furthermore, in some embodiments, a single physical unit (e.g., server) may run multiple client application programs simultaneously or separately.

The platform 104, such as a cloud service, may include any suitable number of computing devices (e.g., computers) in one or more locations that are connected together and communicate using one or more networks. For instance, the platform 104 may include various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110. The CMDB 108 may be expanded using discovery probes and/or by adding devices/services using a service catalog running on the application server 107.

Additional to or in place of the CMDB 108, the platform 104 may include one or more other database servers. The database servers are configured to store, manage, or otherwise provide data (e.g., SLAs, user account data, etc.) for delivering and/or managing delivery of services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or other suitable non-transient storage structures. In some embodiments, more than a single database server may be utilized. Furthermore, in some embodiments, the platform 104 may have access to one or more databases external to the platform 104 entirely.

In the depicted topology, access to the platform 104 is enabled via a management, instrumentation, and discovery (MID) server 126 via a communication channel, such as an External Communications Channel (ECC) Queue 128 and/or other queueing mechanisms. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

The MID server 126 may periodically and/or intermittently use discovery probes to determine information on devices connected to the network 112 and return the probe results back to the platform 104. Probes may have different types and functions. For example, some probes get the names of devices of specific operating systems (e.g., Windows or Linux) while other exploration probes return disk information for those devices using the operating systems. Some probes run a post-processing script to filter the data that is sent back to the platform 104.

As a non-limiting example, the probe types available for use by the MID server 126 may include a Shazzam probe that determines what devices are active using a targeted port scan, a user-defined probe class, a multi-probe that combines probe types, and/or any combination thereof. Additionally or alternatively, the probe types may include any probe type that determines information about CIs 110.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112. Furthermore, some CIs (e.g., laptop computers, cellular devices) may physically enter and/or exit the network. In such embodiments, the MID server 126 may utilize secure channels (e.g., VPNs) to communicate with the CI 110 when outside of the network.

The ECC queue 128 may be a database table that is typically queried, updated, and inserted into by other systems. Each record in the ECC queue 128 is a message from an instance in the platform 104 to a system (e.g., MID server 126) external to the platform 104 that connects to the platform 104 or a specific instance running in the platform 104 or a message to the instance from the external system.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
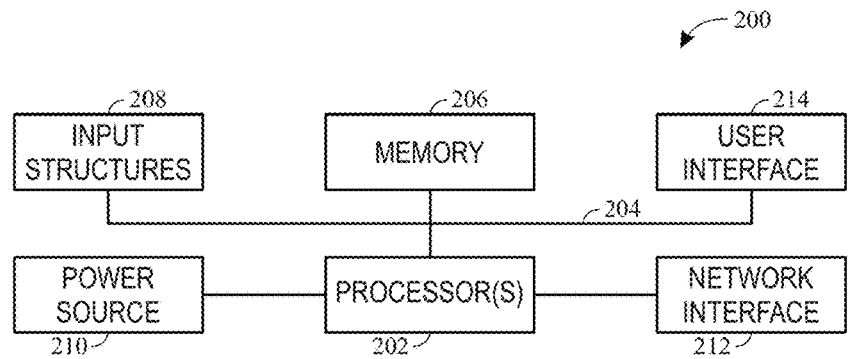
FIG. 2 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), device running the MID server 126, and/or any of the CIs 110. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or in another accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternatively or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
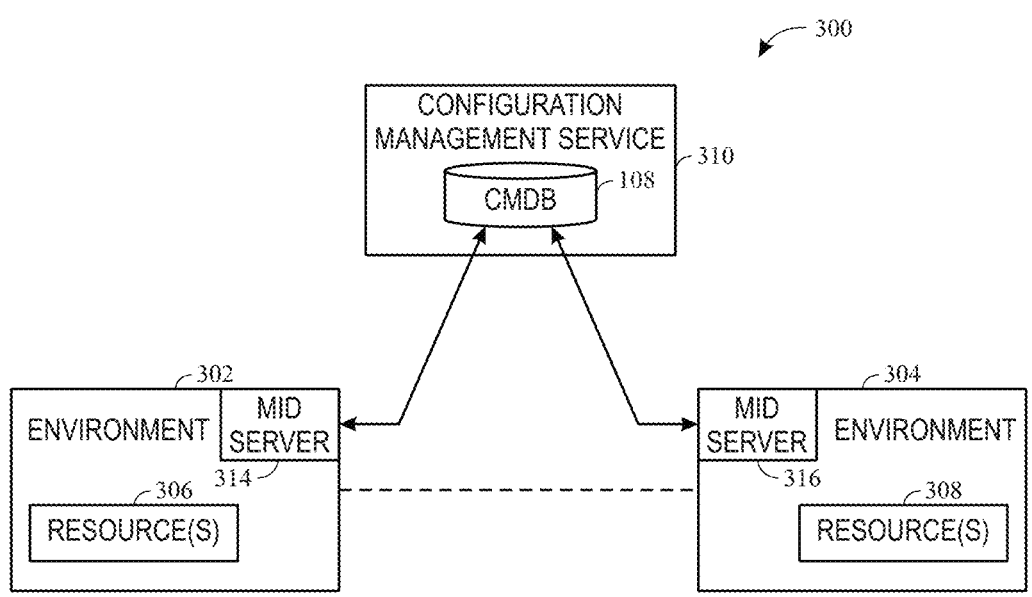
FIG. 3 is a block diagram of an electronic computing and communication system for implementing or accessing a platform/cloud service of FIG. 1, in accordance with an embodiment.

FIG. 3 is a block diagram of an embodiment of an electronic computing and communication system 300 for discovering and/or managing connected CIs. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 may of the environments 302, 304 may communicate with each other across environments. However, in some embodiments, aspects of various environments may be provided by different vendors without communication therebetween. In such embodiments, the resources of disparate environments may communicate using the platform 104 (e.g., a configuration management service 310 that is a part of the platform 104 including the CMDB 108). The resources 306 and 308 may include any of the CIs 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated using the client 102, scheduled for periodic occasions (e.g., periodic discovery), or a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server 126A or 126B may be employed when the MID server may reach into multiple environments. For example, if the MID server 126A or 126B is run in the platform 104 (e.g., in the configuration management service 310), a single MID server 126A or 126B may be used to manage both environments 302 and 304. Additionally or alternatively, if the MID server 126A has access to the environment 304, the MID server 126B may be omitted.

As previously discussed, each discovered resource may be identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

Figure 4:
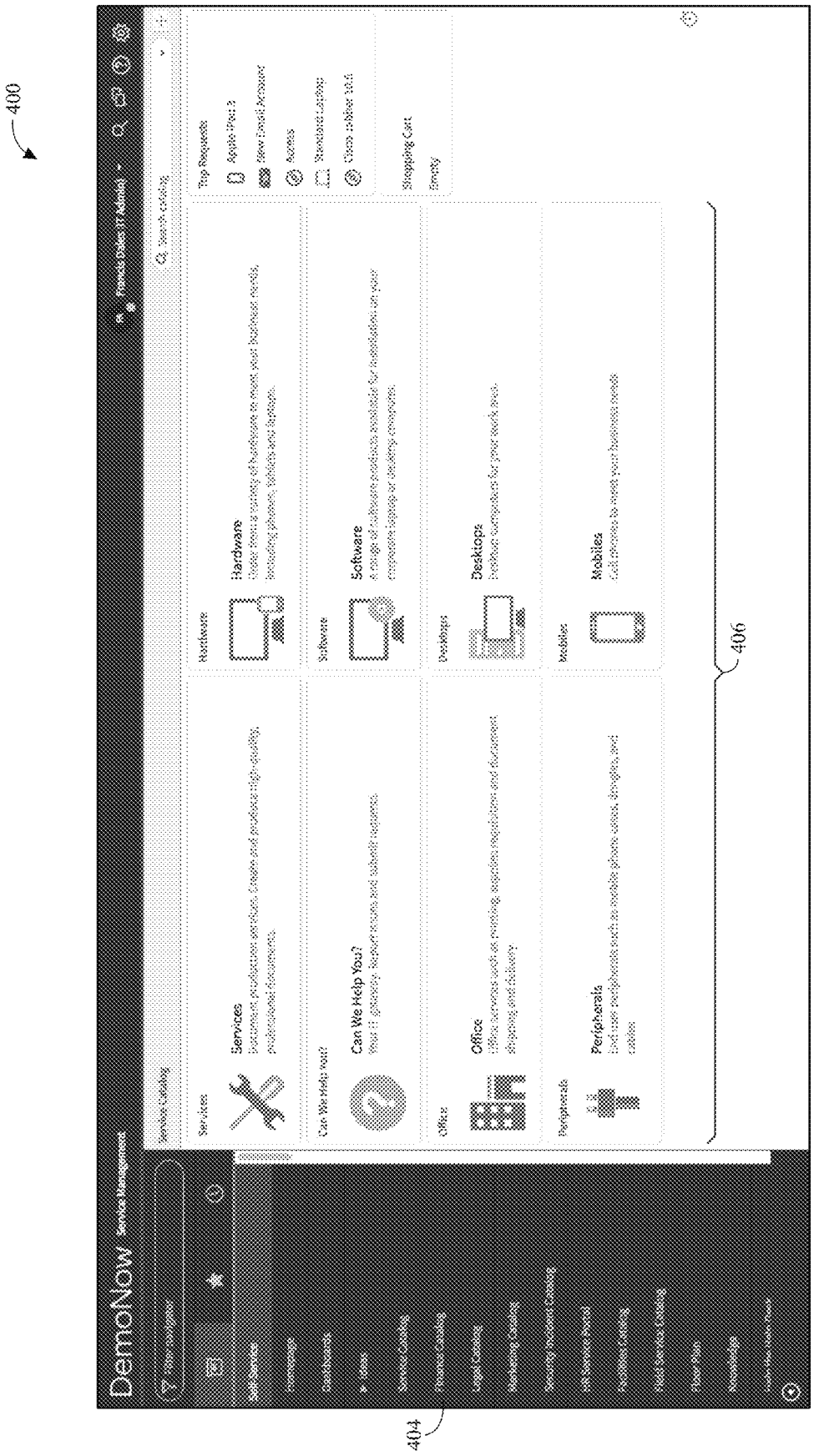
FIG. 4 is a user interface of a service catalog for offering goods and/or services, in accordance with an embodiment.

The service catalog may track and provide various options with a large amount of variables, macros, and/or customizations that may cause a particular instance of the service catalog (or an application program running the service catalog) to encounter errors during operation. Due to potentially massive quantity of variables, macros, and customizations in an end user's environment, various services offered through the service account may cause changes to these customizations, may cause crashes of application programs, and/or encounter other conflicts. For example, FIG. 4 illustrates an embodiment of a graphical user interface (GUI) 400 for a service catalog. As illustrated, the GUI 400 may provide an interface for the service catalog and may provide service management tools that may be accessed using a menu 402, such as a sidebar or any other navigable menu. These service management tools may be accessed through a web browser and/or a dedicated application program. Additionally or alternatively, the service portal may be accessed without access to other service management tools. In the illustrated embodiment, the service catalog may be accessed via a service catalog entry 404 in the menu 402. The GUI 400 includes multiple options 406. Each of these options may include numerous sub-options. Furthermore, each option or sub-option may have numerous variables, macros, scripts, and/or other customizations associated therewith creating a potentially dynamic environment from end-user to end-user. When changes are to be made to the services in the service catalog, the service catalog may encounter difficulties (e.g., encounter errors, undesired functionality) due to the customizations that effect changes in operation of the service catalog. Thus, to streamline operation and/or enhance debugging the service catalog, the service catalog may be utilized in an automated testing framework to confirm intended operation. For example, simulations of processes using the service catalog may be simulated, upgrades and/or downgrades to goods and services may invoke indication of which macros would be effected, variables may be tracked during interaction with portions of the service catalog to debug and/or change service catalog behavior, and/or other testing framework functionality to ensure that the service catalog functions as expected.

Figure 5:
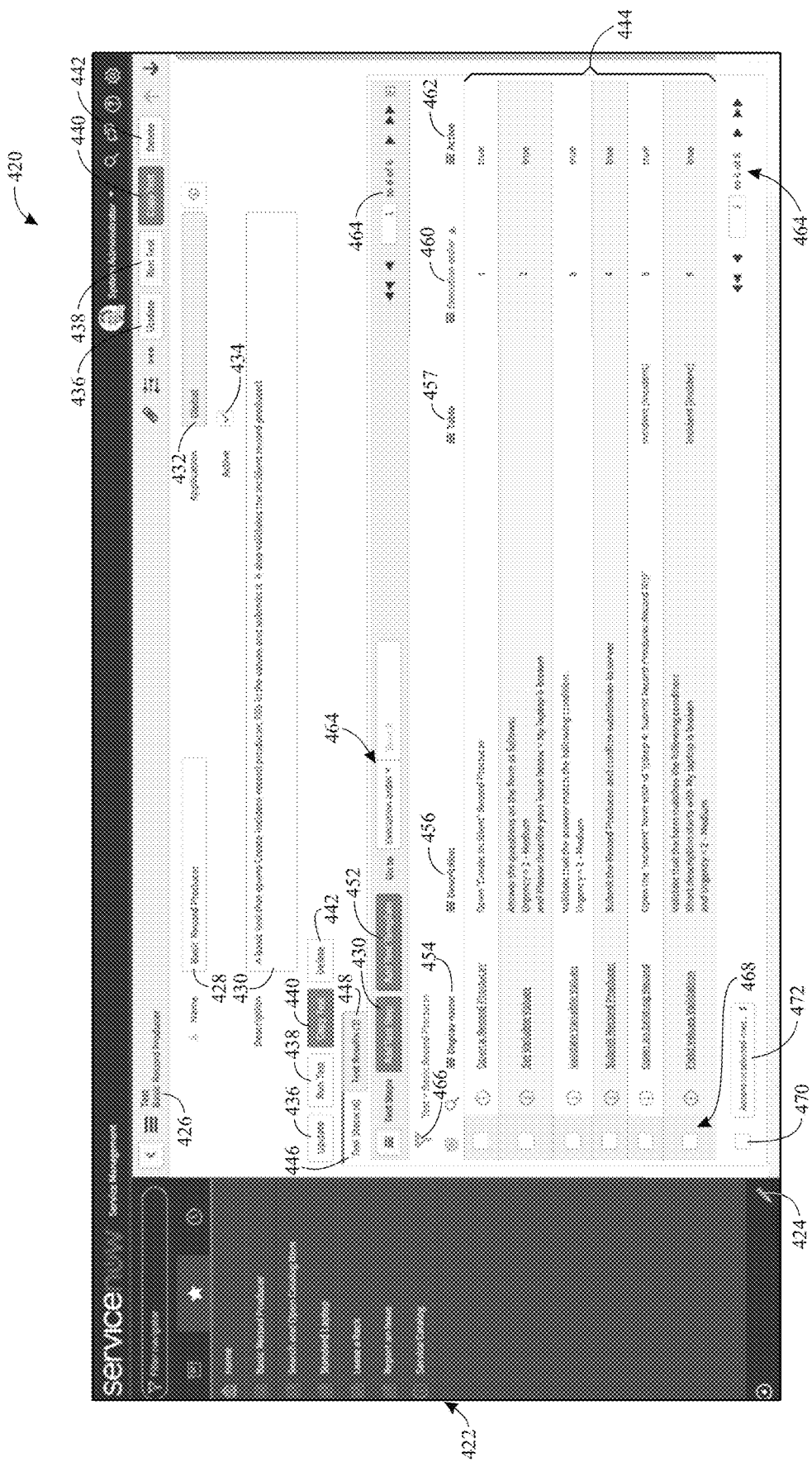
FIG. 5 is a user interface for an automated test framework (ATF) for testing items of the service catalog, in accordance with an embodiment.

FIG. 5 illustrates an embodiment of an automated testing framework (ATF) 420 applied to the service catalog. The ATF 420 lists various catalog-based tests 422 that are integrated with the ATF 420 to implement testing using the service item selected. The catalog-based tests 422 pertain to one or more catalog items available. The catalog-based tests 422 may include all or only some of the catalog items available in the service catalog that are integrated into the ATF 420. In some embodiments, the catalog-based tests 422 may include administrator-provided tests/testing categories and/or user-created tests/testing categories. Creation of new catalog-based tests 422 may be selected using an edit item 424.

Upon selection of a catalog-based test 422 (e.g., Basic Record Producer), the selected catalog-based test is displayed as the tested item 426. The name of the tested item 426 may be changed using a name field 428. Name changes made using the name field 428 may be reflected in the list of catalog-based tests 422. The catalog-based tests 422 themselves may be step-by-step tests that may be run on the service catalog. The ATF 420 may also be used to indicate what level of applicability pertains to the selected test using an application item 432 and to indicate whether the test is enabled using an active item 434.

The ATF 420 may also include functionality to update catalog-based tests 422 using an update item 436, to run the selected test using a run item 438, to copy the selected test using a copy item 440, and/or to delete deselected test using a delete item 442. Each selected test may include multiple test steps 444 viewed in a test step tab 446. The ATF 420 may also include test results in a test results tab 448 for previous tests run on the service catalog. The test steps 444 may be supplemented using an add test step item 450 to add blank steps or add test template item 452 to add templated steps. The test steps tab 446 may display various information about each test step 444. For example, illustrated test steps tab 446 includes a display name 454, a description 456, a table 458, in execution order 460, and an active status 462. The display name 454 provides a name for the respective step. The description 456 describe what is performed by the respective test step. The table 458 indicate any tables that may be accessed and/or updated by the respective test step. The execution order 460 indicates the order in which the test steps are performed. The active status 462 indicates whether the respective test is enabled. The number of test steps included in a single test may be quite large. Thus, the ATF 420 may include navigational controls 464 to navigate between pages of test steps 444 and/or filtering controls 466 to filter test steps 444. Each test step 444 may be acted upon through the ATF 420 using a step selector 468. All of the test steps 444 may be selected using a select all control 470. The selected test steps 444 may be acted upon using action menu 472. The action menu 472 may include various actions or operations that may be performed on the test steps 444, such as deleting test steps, duplicating test steps, activating/deactivating test steps, and/or other suitable operations.

Figure 6:
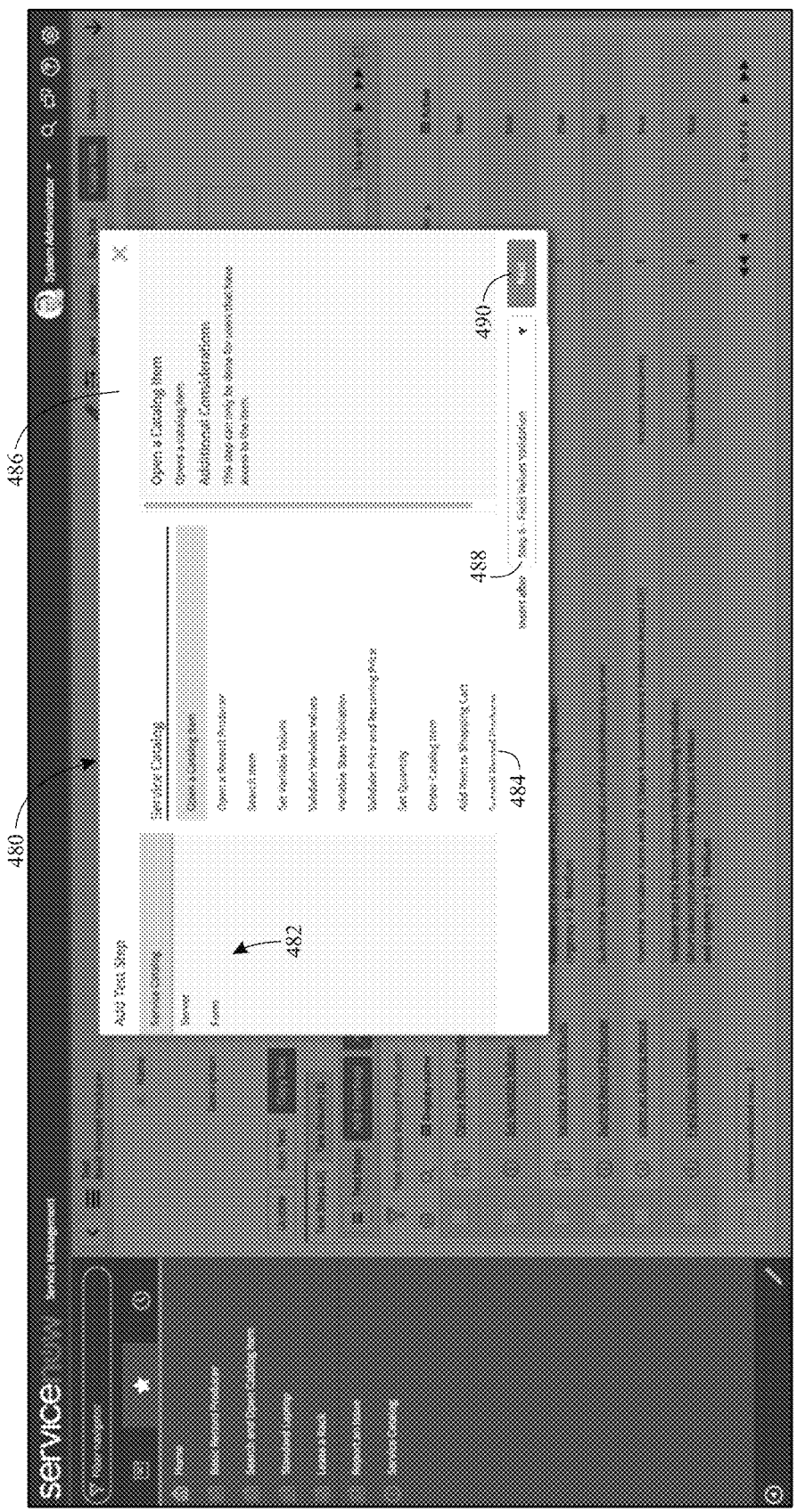
FIG. 6 is dialogue for adding test steps to a selected test in the ATF of FIG. 5, in accordance with an embodiment.

FIG. 6 illustrates an add test menu 480 that may be invoked in response to a selection of the add test step item 446 and/or the add test template item 448. As illustrated, the available test steps to be added may be to categorize into categories 482. Each category 482 may include various addable test steps 484. Upon selection of an addable test step 484, the test step menu 480 may provide a summary of the selected addable test step 484. The add test menu 480 may also provide an order item 488 to indicate where in the selected test, the addable test step 484 is to be performed. The add test menu 480 may also include a confirmation button 490 to indicate when the appropriate addable test step 484 has been suitably selected.

Figure 7:
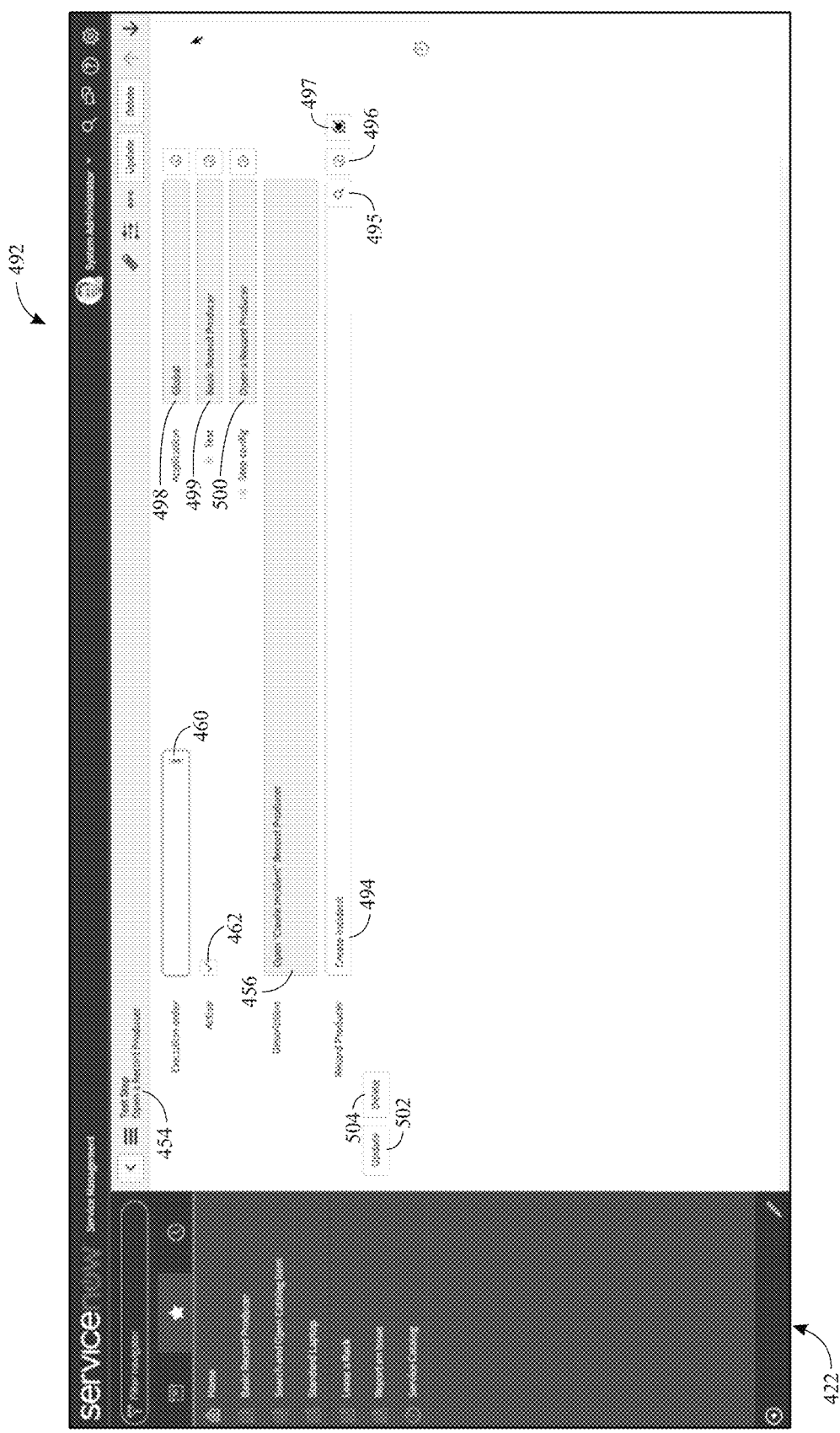
FIG. 7 is a test step menu for inputting settings of a first step of the selected test, in accordance with an embodiment.

FIG. 7 illustrates an embodiment of a test step menu 492. The test step menu 492 provide various information about a selected test step. For example, the test step menu 492 may include the display name 454, the description 456, the execution order 460, and/or the active status 462. In some embodiments, the display name 454, the description 456, the execution order 460, and/or the active status 462 may be changed using the test step menu 492. The test step menu 492 also includes an indicator 494 indicating various functions called from, variables referencing, and/or relationship to a respective catalog item. The test step menu 492 enables searching such possible functions, variables, and/or relationships using a search button 495. The test step menu 492 enables viewing additional information about such possible functions, variables, and/or relationships using an information button 496. The test step menu 492 enables combining such possible functions, variables, and/or relationships using an add more button 495.

The test step menu 492 may also display applicability 498, parent test 499, and configuration 500 items. In some embodiments, these details are determined from a template and/or from the parent test 499 to which the test step belongs. Any changes that are made via the test step menu 492 may be saved using an update button 502. The changes and/or the test step itself may be deleted using a delete button 504.

FIG. 7 illustrates an embodiment of a test step menu 520 for a test step to be performed subsequent to the test step corresponding to the test step menu 490, as indicated by the value of "2" in the execution order 460. The test step menu 520 may also display the display name 454, the description 456, the active status 462, the indicator 494, the applicability 498, the parent test 499, the configuration 500, and/or other items similar to those shown in the test step menu 492 of FIG. 7.

Since the test step menu 520 relates to setting variable values, the test step menu 520 may also include variable inputs 522 for inputting values into a tested service catalog item (e.g., record producer) to test the service catalog item. In the illustrated embodiment, the variable inputs 522 include 3 entries: entry 524, 526, and 528. The entries 524, 526, and 528 have variable name fields 524A, 526A, and 528A, respectively. The entries 524, 526, and 528 also have value fields 524B, 526B, and 528B, respectively. In other words, a field pair (e.g., fields 524A and 524B) form a name-value pair. Furthermore, as illustrated, one entry (e.g., entry 528) may remain blank. In some embodiments, if this entry is filled, a new blank entry is added to the variable inputs 522. Alternatively, an add entry button may be included in the test step menu 520. When an entry is to be deleted, an entry deletion button 530 may be selected. When all variable values to be input are indicated in the variable inputs 522, the values may be saved/updated via an update button 532. When the changes are to be deleted/revert to previous settings, a delete button 534 may be selected.

Figure 9:
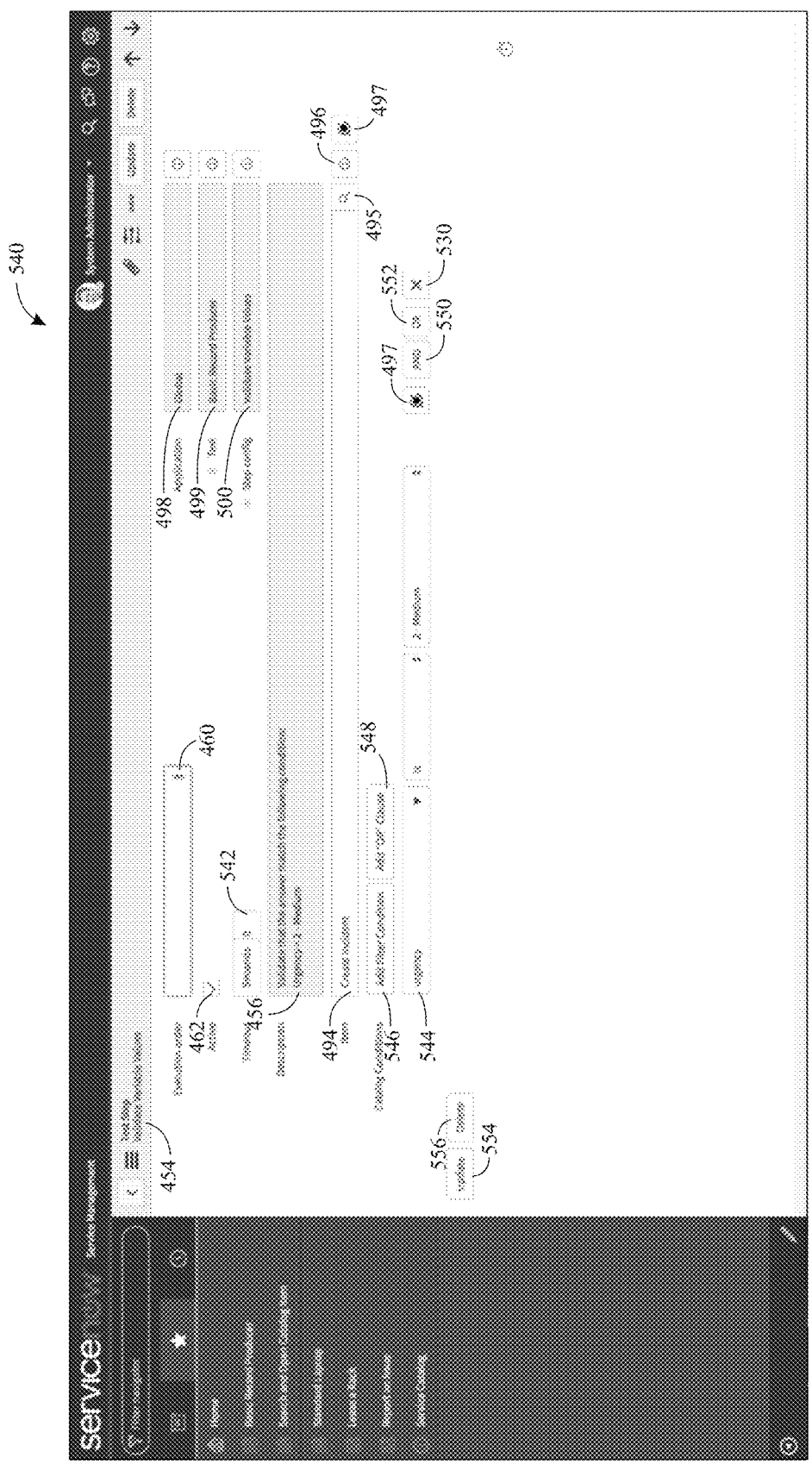
FIG. 9 is a test step menu for inputting settings of a third step of the selected test, in accordance with an embodiment.

FIG. 9 illustrates a test step menu 540 corresponding to a third test step as indicated by the execution order 460. The test step menu 540 may also display the display name 454, the description 456, the active status 462, the indicator 494, the applicability 498, the parent test 499, the configuration 500, and/or other items similar to those shown in the test step menu 492 of FIG. 7. The test step menu 540 (as well as any test step menus) may include a timeout selector 542 used to indicate how long the step is to run during automation before timing out the step to halt the testing process.

Since the test step menu 540 corresponds to validating variables to determine whether variable entry using the first step has functioned properly, the test step menu 540 may include catalog conditions 544 to validate the variables. These catalog conditions 544 may be filtered using an add filter condition button 546. Furthermore, each condition may include an "OR" state, such as urgency is "2-Medium OR 3-High." To add this OR clause to the condition 544, an add "OR" clause button 548 may be selected. Additionally or alternatively, additional conditions may be added to the catalog conditions 544. Since the interaction of the conditions may be conjunctive (e.g., AND) or disjunctive (e.g., OR), adding a new condition may be done conjunctively using an AND button 550 or disjunctively using an OR button 552. Once all suitable conditions are added and populated, the catalog conditions 544 may be saved using an update button 554. If changes to the conditions are not to be saved, they may be deleted using the delete button 556.

Figure 10:
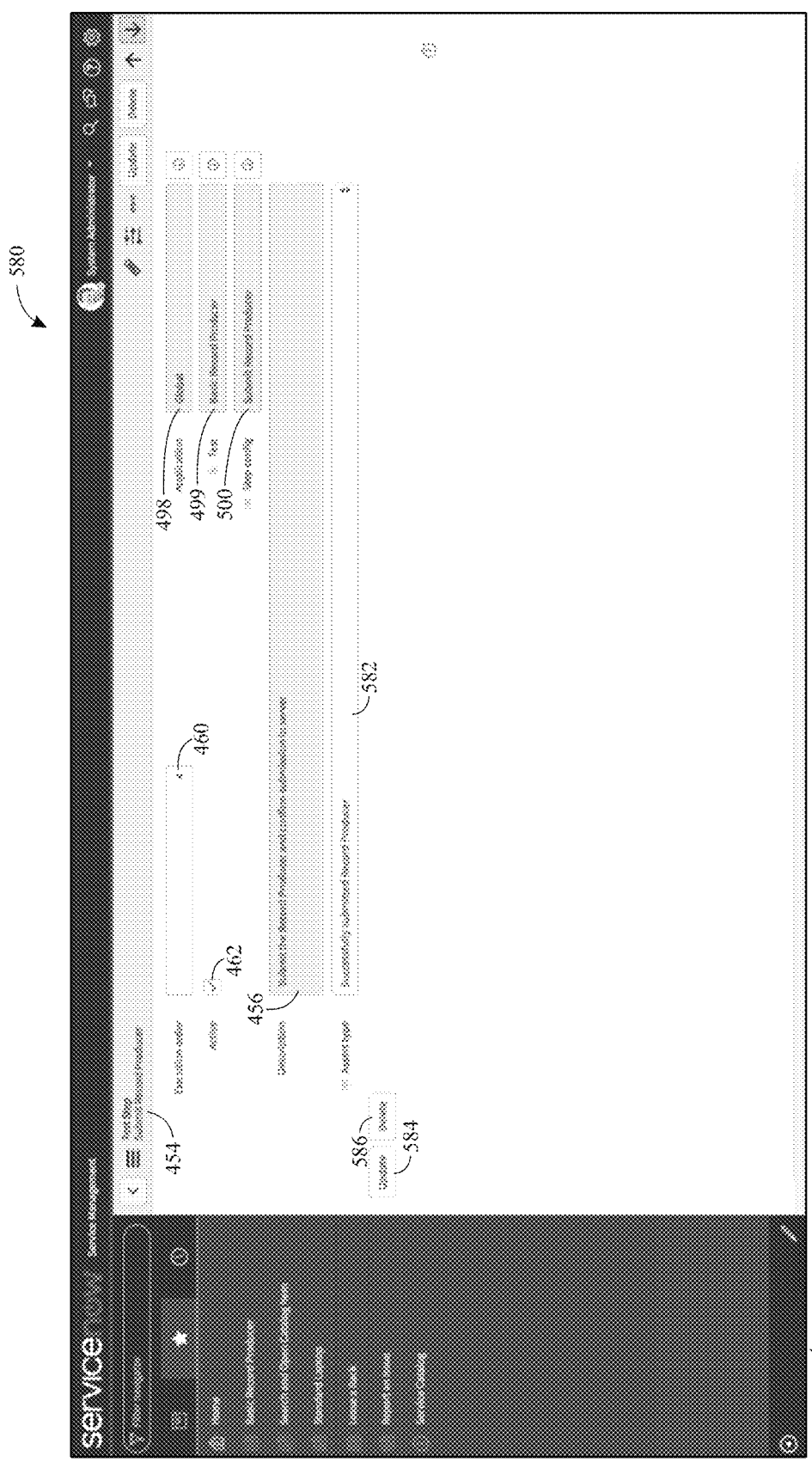
FIG. 10 is a test step menu for inputting settings of a fourth step of the selected test, in accordance with an embodiment.

FIG. 10 illustrates a test step menu 580 corresponding to a fourth test step as indicated by the execution order 460. The test step menu 580 may also display the display name 454, the description 456, the active status 462, the applicability 498, the parent test 499, the configuration 500, and/or other items similar to those shown in the test step menu 492 of FIG. 7. The test step menu 580 relates to submitting record producer items and confirming submission. To this end, the test step menu 580 includes an assertion 582 that indicates that an assertion to confirm that the record producer been successfully submitted. The test step menu 580 also includes an update button 584 to save changes and a delete button 586 to delete changes made in the test step menu 580 that have not been previously saved.

Figure 11:
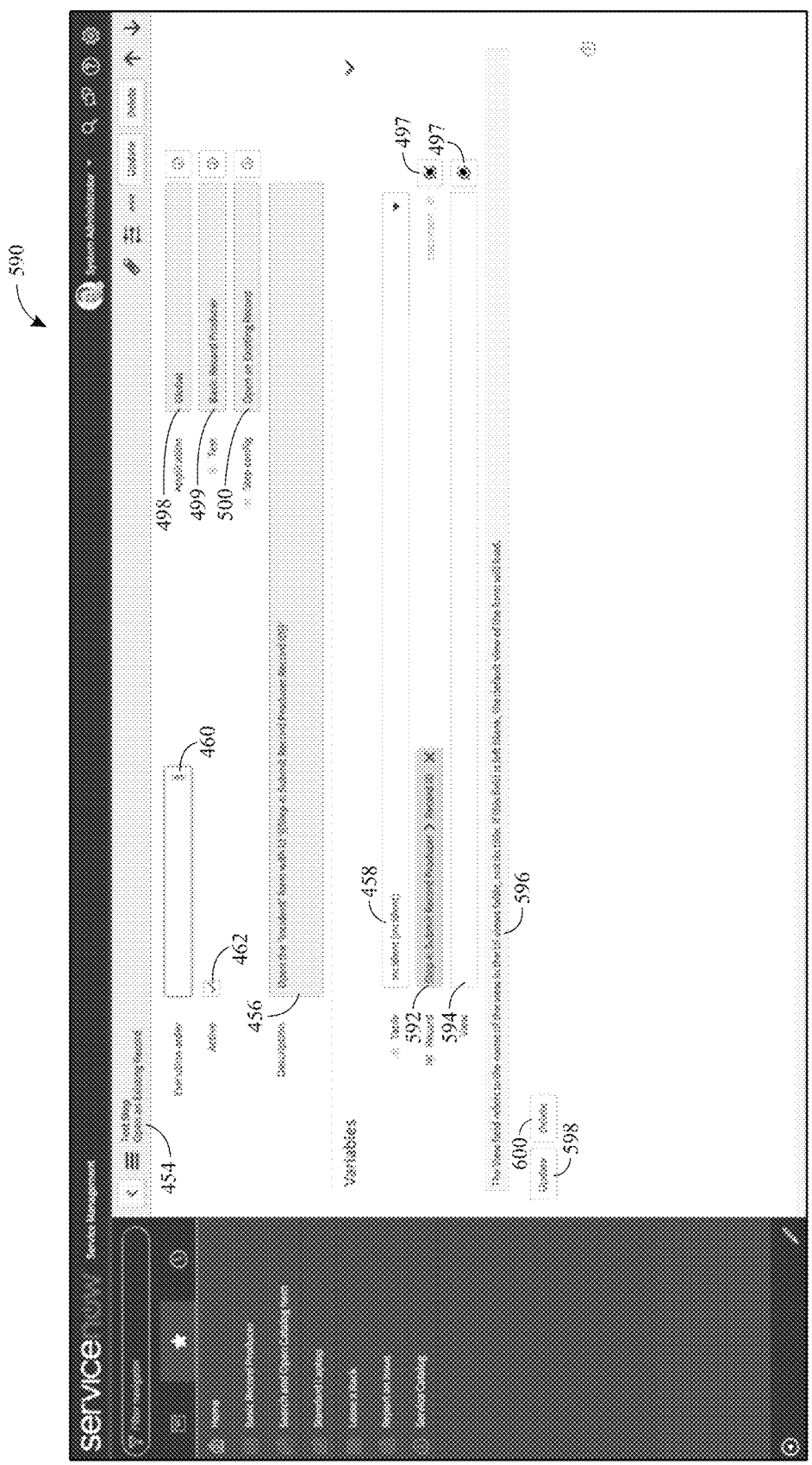
FIG. 11 is a test step menu for inputting settings of a fifth step of the selected test, in accordance with an embodiment.

FIG. 11 illustrates a test step menu 590 corresponding to a fifth test step as indicated by the execution order 460. The test step menu 590 may also display the display name 454, the description 456, the table 458 for the respective step, the active status 462, the applicability 498, the parent test 499, the configuration 500, and/or other items similar to those shown in the test step menu 492 of FIG. 7. The fifth step relates to opening an incident form created from the previous step. To obtain the record created from the previous step, the record may be indicated in a record field 592 used to indicate a record to be opened for later steps. As indicated, the record to be opened may be indicated from the step used to create the record. This indication may be used to track the record identifier (e.g., document identifier) generated in the indicated step. The test step menu 590 may also include a view field 594 that refers to a name of the view type used to open the record. In some embodiments, the view field 594 may be left blank to use a default view. The test step menu 590 may also include tips 596 that provide information/instructions on how to use the test stop menu 590. Once the record to be opened has been indicated, the changes may be update via an update button 598 or discarded via a delete button 600.

Figure 8:
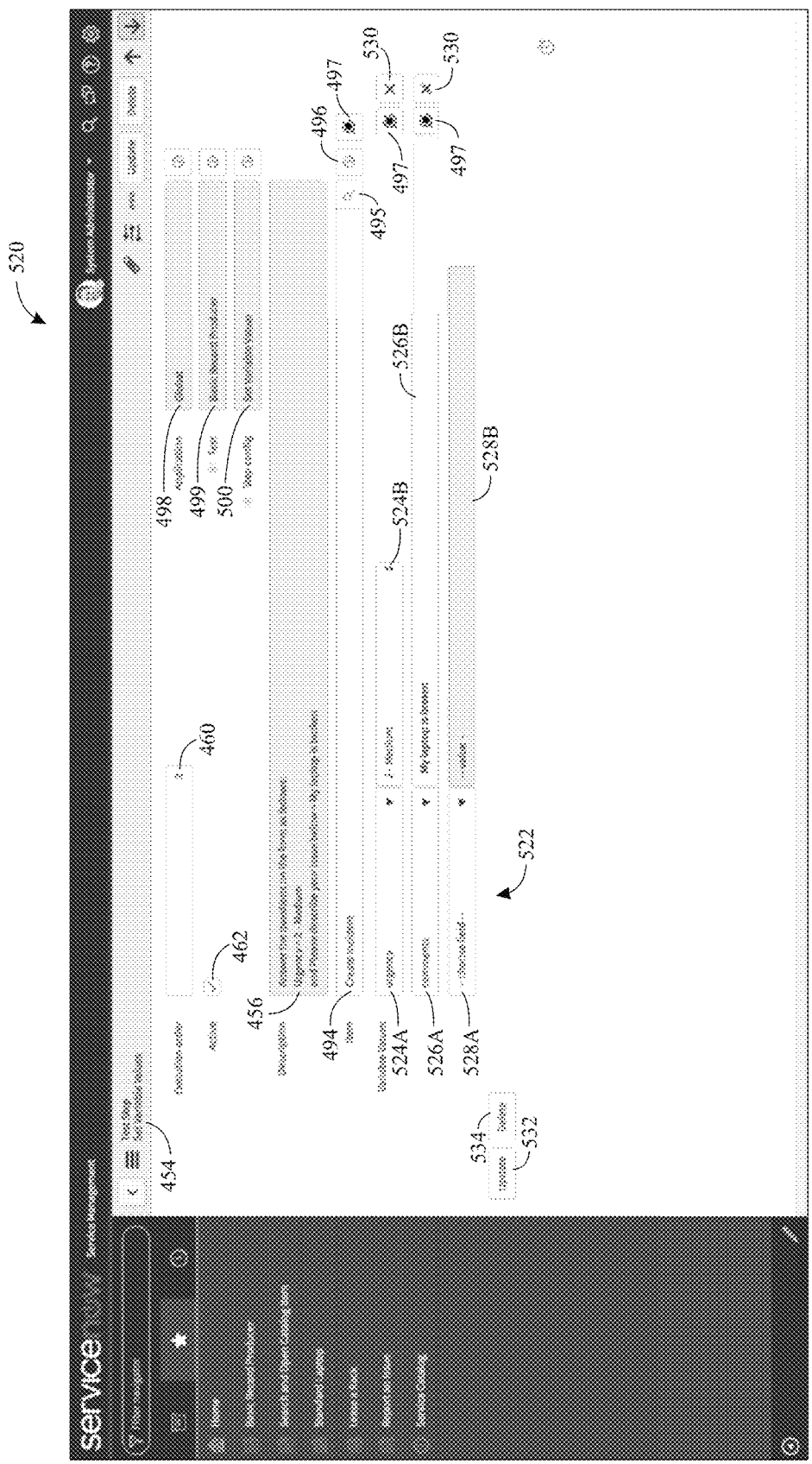
FIG. 8 is a test step menu for inputting settings of a second step of the selected test, in accordance with an embodiment.
Figure 12:
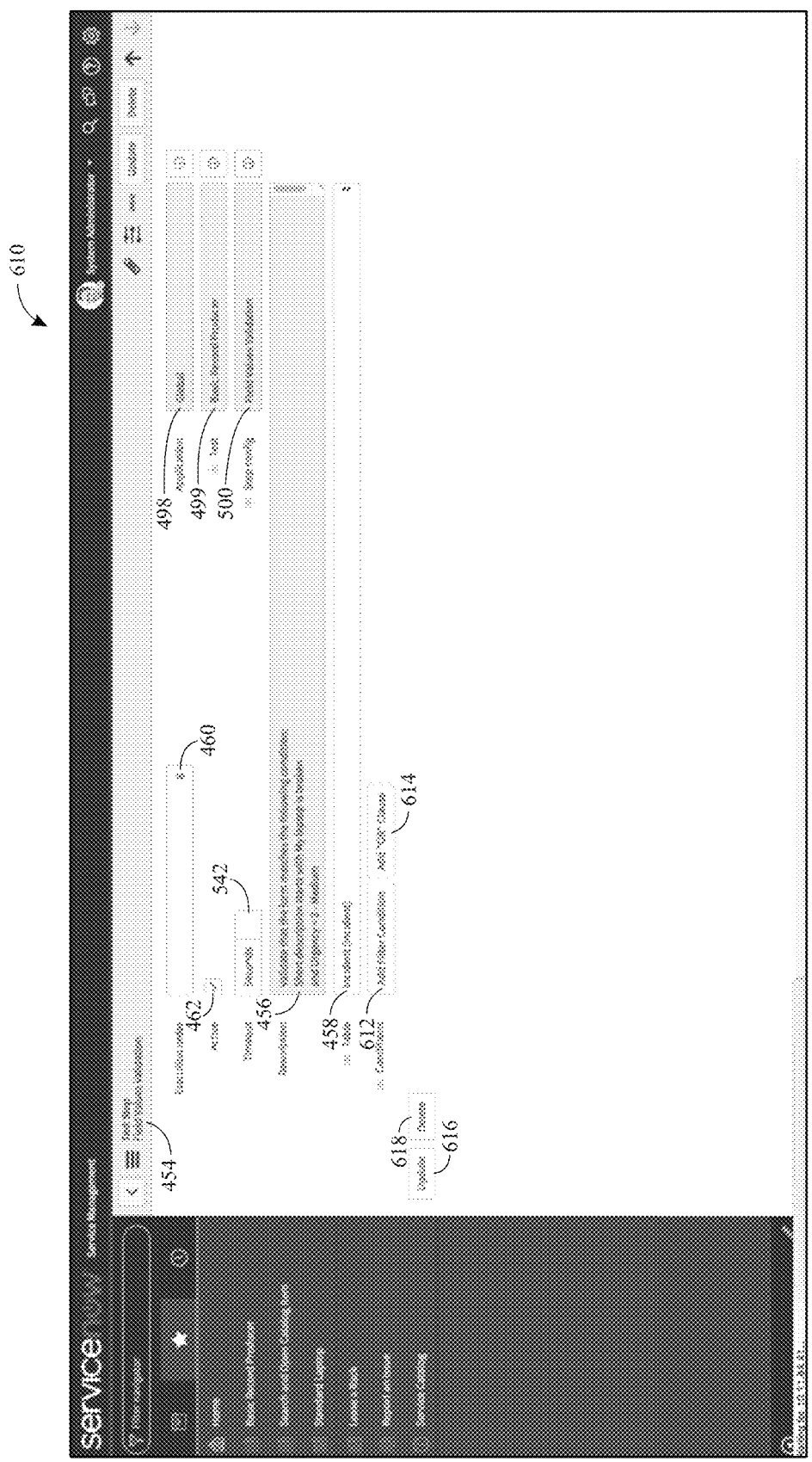
FIG. 12 is a test step menu for inputting settings of a sixth step of the selected test, in accordance with an embodiment.

FIG. 12 illustrates a test step menu 610 corresponding to a sixth test step as indicated by the execution order 460. The test step menu 590 may also display the display name 454, the description 456, the table 458 for the respective step, the active status 462, the applicability 498, the parent test 499, the configuration 500, and/or other items similar to those shown in the test step menu 492 of FIG. 7. Similar to the test step menu 540 of FIG. 9, the test step menu includes a timeout selector 542. The test step menu 610 relates to validation of variables in the record. In some embodiments, these values may be automatically validated using values used in the test step menu 520 of FIG. 8. Additionally or alternatively, conditions may be added for validation using the add filter condition button 612 and/or the add "OR" clause button 614. The conditions stored and/or input into this step confirm that values in the record are as intended based on the values input into a request into the service catalog. In other words, this step confirms that data is properly input and stored in records created by the tested service catalog item (e.g., record producer).

FIGS. 7-12 pertain to six steps included in a test, but other tests may include 1, 2, 3, 4, 5, 6, or more steps. Furthermore, the various tests through the ATF 420 may pertain to any service catalog item. For example, tests may be run to determine whether a lease rack service catalog item works properly, whether adding/upgrading a laptop works service catalog item functions properly, whether a create and open catalog item functions properly, whether an issue reporting catalog item functions properly, and/or whether any other catalog item functions properly.

Figure 13:
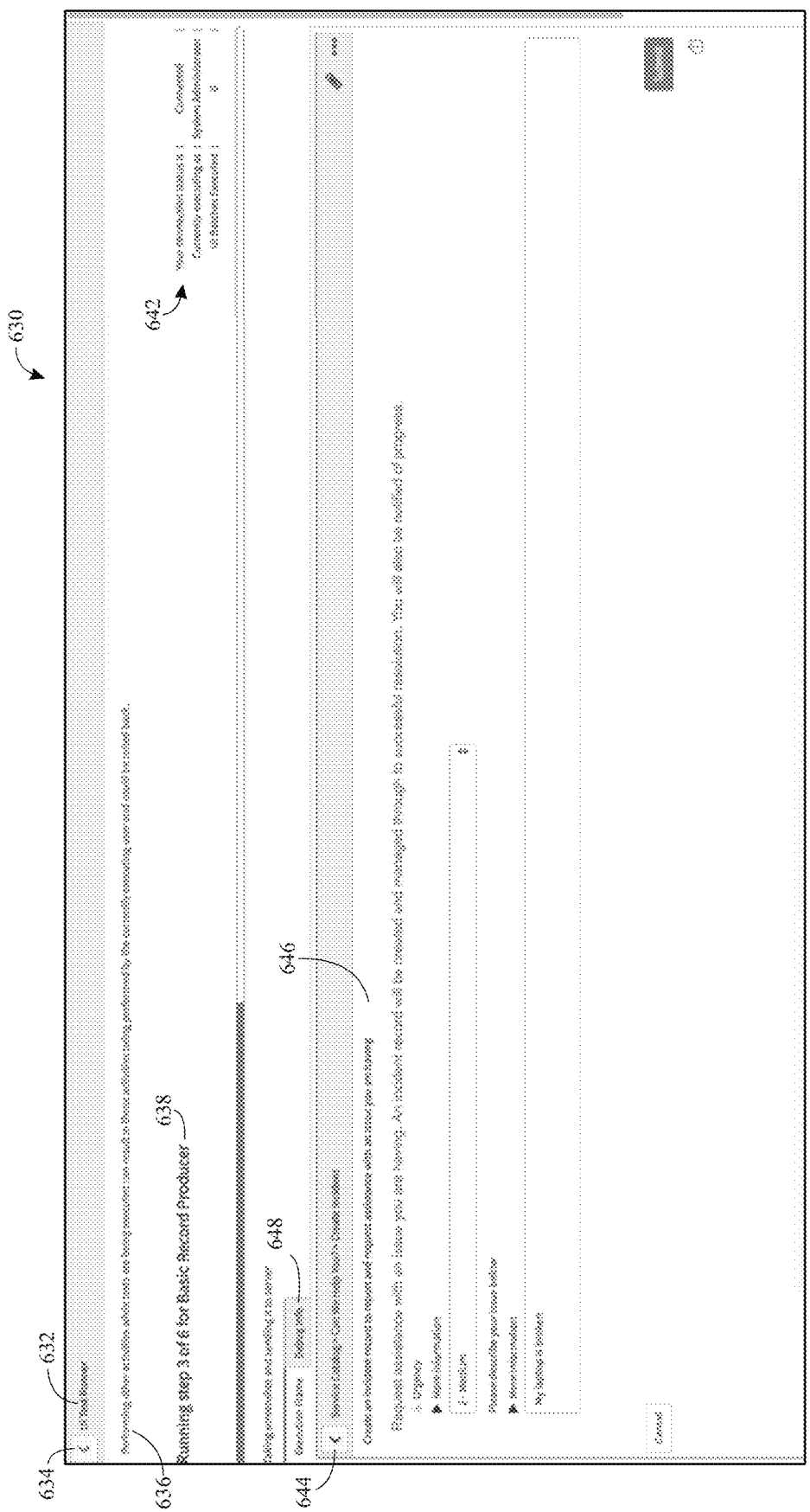
FIG. 13 is a status page for automation of the selected test, in accordance with an embodiment.

When all of the steps of a test are completed, the test may be run. FIG. 13 illustrates a status page 630 used to indicate a status of the running test. The status page 630 may indicate a name 632 of the test runner (e.g., ATF 420) and a cancellation button 634 to cancel the running test. The status page 630 may also include various dialogue 636 about the automated testing environment. Moreover, the status page 630 may include a textual status 638 and/or a status bar 640 indicating progress of the running test. For example, the textual status 638 and/or the status bar 640 may indicate a step currently being run. The status page 630 may also indicate various statuses 642 of the test(s) being run. For example, the various statuses 642 may indicate a connection status, an account used to run the test(s), number of test(s) being batched, an individual duration of the test(s) by individual test, a total duration of a batch of tests, and/or other various connection/time-related statuses.

The status page 630 may also be used to view the steps as executed in an execution frame 644. In other words, the execution frame 644 may enable reviewing of the automated testing as the various UI items undergo automated interaction with the settings set in the test steps. For instance, the execution frame indicates a UI page 646 that is used in the third step to input the variable values indicated in the test step menu 540 of FIG. 9. In other words, the execution frame 644 shows a reviewer what a user would view when utilizing the tested catalog item. The status page 648 may also be used to access a debug information frame 648 that shows various information about errors and/or warnings that arise in the test run. For example, the debug information frame 648 may include information about a step that has taken longer than allotted via the timeout selector 542 or that fails for any other reason.

Figure 14:
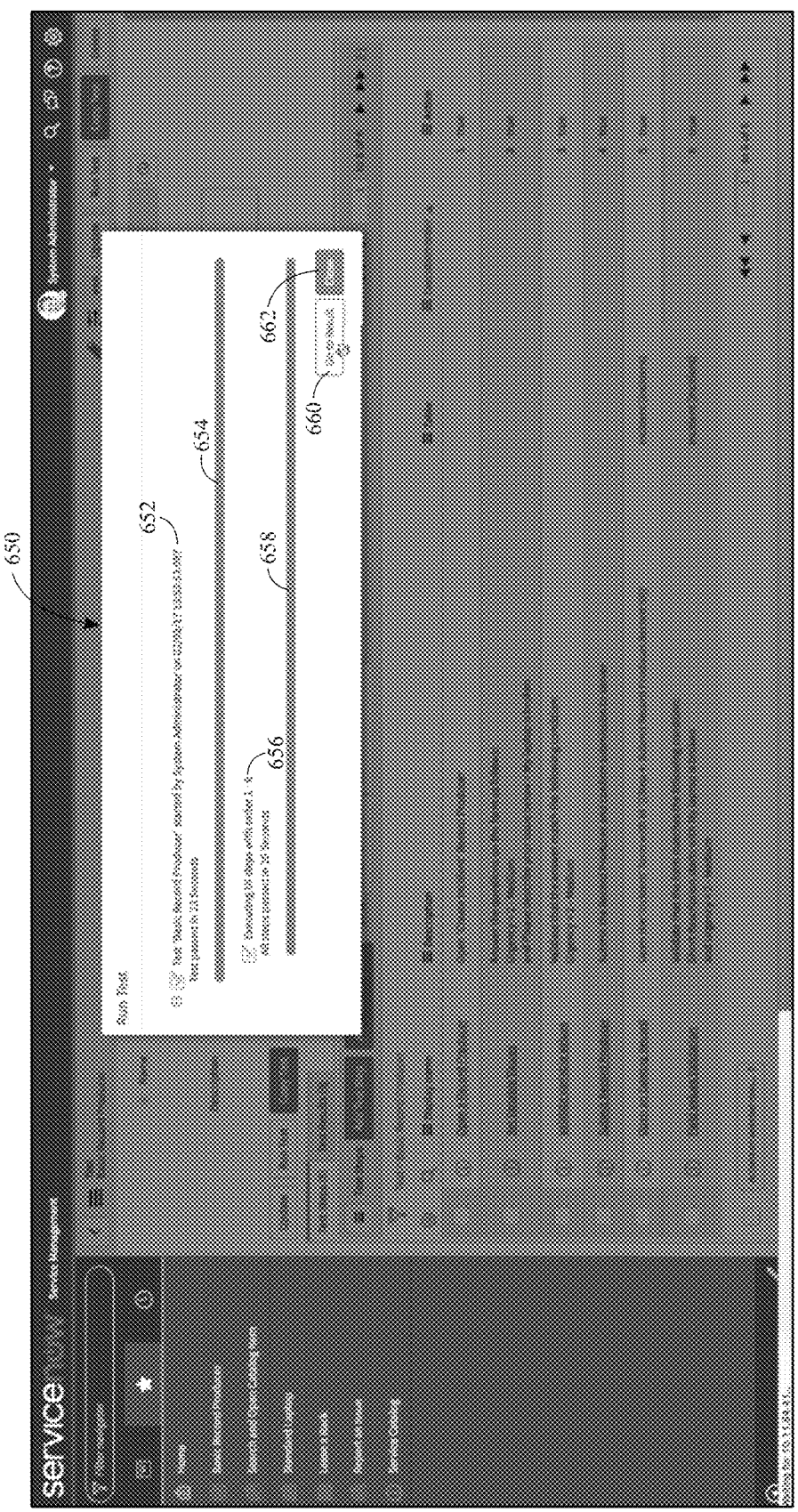
FIG. 14 is a summary frame for automation of the selected test, in accordance with an embodiment.

Once the test(s) have completed, a test summary frame 650 may be presented, as illustrated in FIG. 14. In some embodiments, the test summary frame 650 may overlay the ATF 420. The test summary frame 650 may include a textual test summary 652 that indicates generally whether the test(s) has completed successfully, how long the test(s) took, what account was used to run the test(s), and/or a start/completion time for the test(s). The test summary frame 650 may also include a test status bar 654 that color indicates whether the test(s) was successfully completed. The test status bar 654 may be a first color (e.g., red) if the test failed to complete, a second color (e.g., yellow) if one or more validation steps are at least partially incorrect, or a third color (e.g., green) if all validations are completed indicating that the values are valid.

The test summary frame 650 may also include a textual step summary 656 that indicates a status of one or more test steps and/or individual tests in a test batch. The textual step summary 656 indicates generally whether the step(s) has completed successfully, the number of steps completed, how long the step(s) took, and/or a start/completion time for the step(s). Although a single textual step summary 656 is included, the test steps may be grouped in any manner providing any number of step summaries. In some embodiments, the textual step summary 656 may be selected to open finer grouping of steps. For each textual step summary 656, a step status bar 658 may be provided to indicate success of the steps at-a-glance using a color scheme similar to the test status bar 654.

From the test summary frame 650 more specific results may be accessed using a results button 660 or may be closed using a close button 662. Thus, using the textual statuses and/or status bars a quick determination may be made whether the catalog item functioned properly. For example, if all status bars are green, the test summary frame 650 may be closed without viewing results. However, if one or more status bars or textual summaries indicate an issue arose during execution, the results may be accessed for individual steps.

Figure 15:
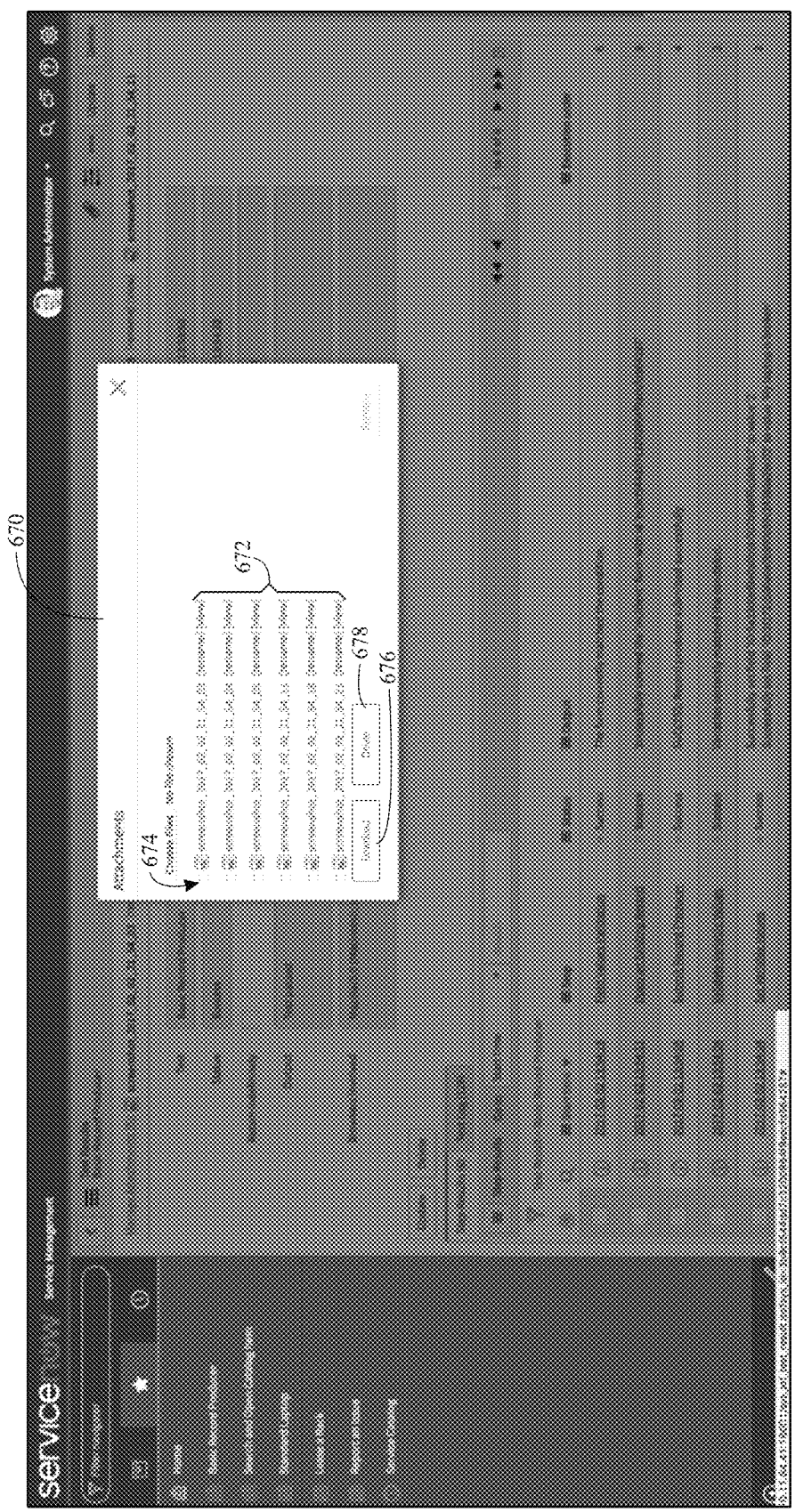
FIG. 15 is a results frame for the automation of the selected test, in accordance with an embodiment.

Selecting the results button 660 may open a results frame 670, as illustrated in FIG. 15. In some embodiments, the results frame 670 may replace the status frame 650 overlaying the ATF 420. The results frame 670 may include attached screenshot indicators 672 that each link to a screenshot for a specific step in the test. In other words, the ATF 420 may capture a screenshot at the end of each step in the test for later review of the service catalog item test. The results frame 670 may provide an ability to select one or more screenshots to be selected for downloading via a download button 676 and/or deleted from memory associated with the ATF 420 using a delete button 678.

Figure 16:
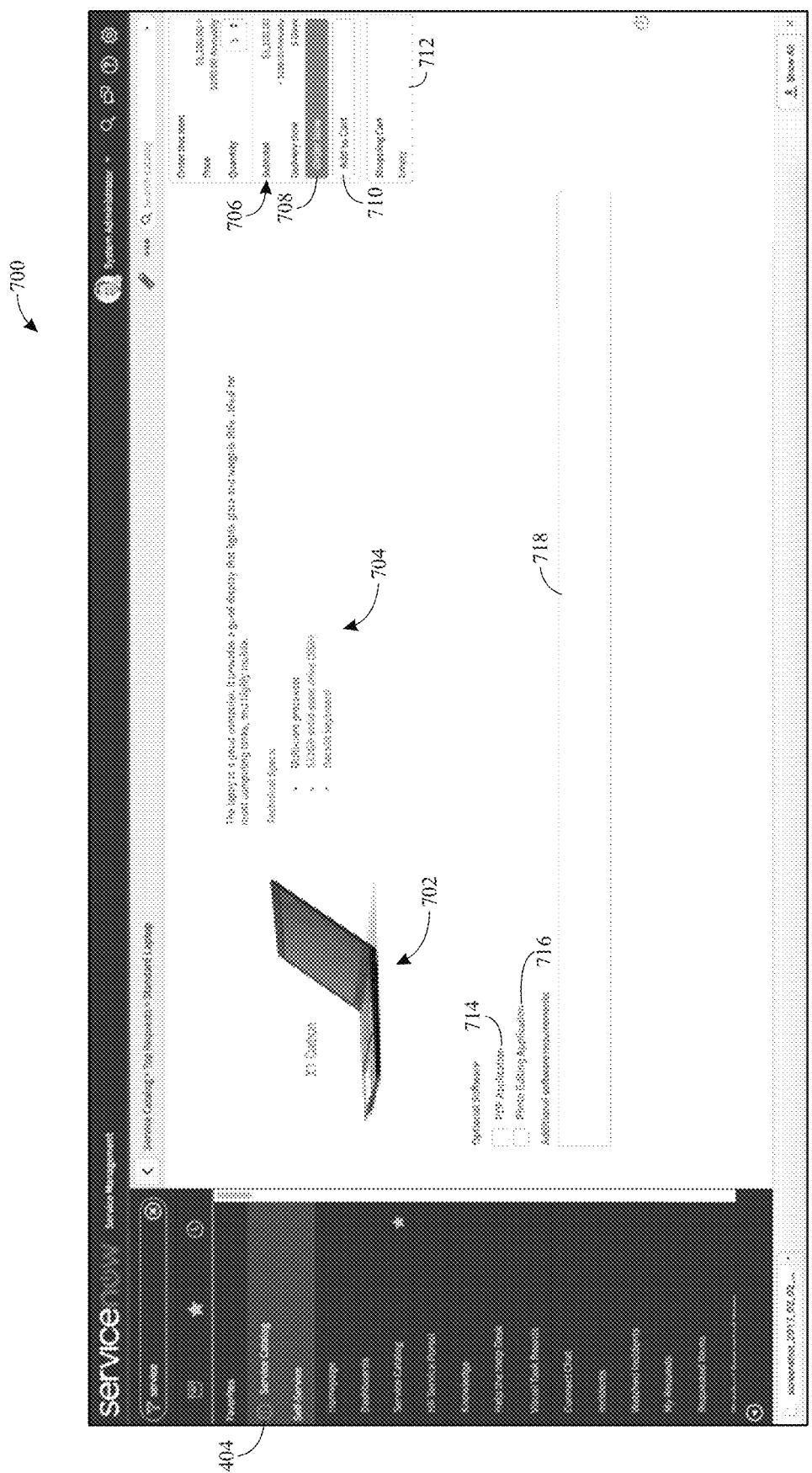
FIG. 16 is a UI showing a service catalog item, in accordance with an embodiment.

As previously noted, the service catalog may be used to determine how functionality is effected by upgrades/downgrades/updates to services in the service catalog, the platform 104, and/or functionality provided in the SLA (e.g., APIs available). With this in mind, FIG. 16 illustrates a UI page 700 in the service catalog for requesting a good/service (e.g., a new laptop). The UI page 700 includes an indicator 702 as an item or image representative of the goods and/or services being ordered. The UI page 700 also includes textual information 704 about the goods and/or services being ordered. The UI page 700 also includes price information 706 about the goods and/or services being ordered. The price information 706 may also include information about whether the goods and/or services are available under the current SLA. The UI page 700 also provides an ability to order the goods and/or services using an order button 708. Additionally, the UI page 700 may provide an ability to add the goods and/or services to a cart using an add to cart button 708 to enable checkout for multiple goods and/or services simultaneously. The UI page 700 may also provide information about the cart in a shopping cart frame 712. The illustrated shopping cart frame 712 indicates that the shopping cart is empty. When the shopping cart has at least one good/service in the shopping cart, the shopping cart frame 712 may provide a checkout button to enable checkout for items currently in the shopping cart.

Figure 17:
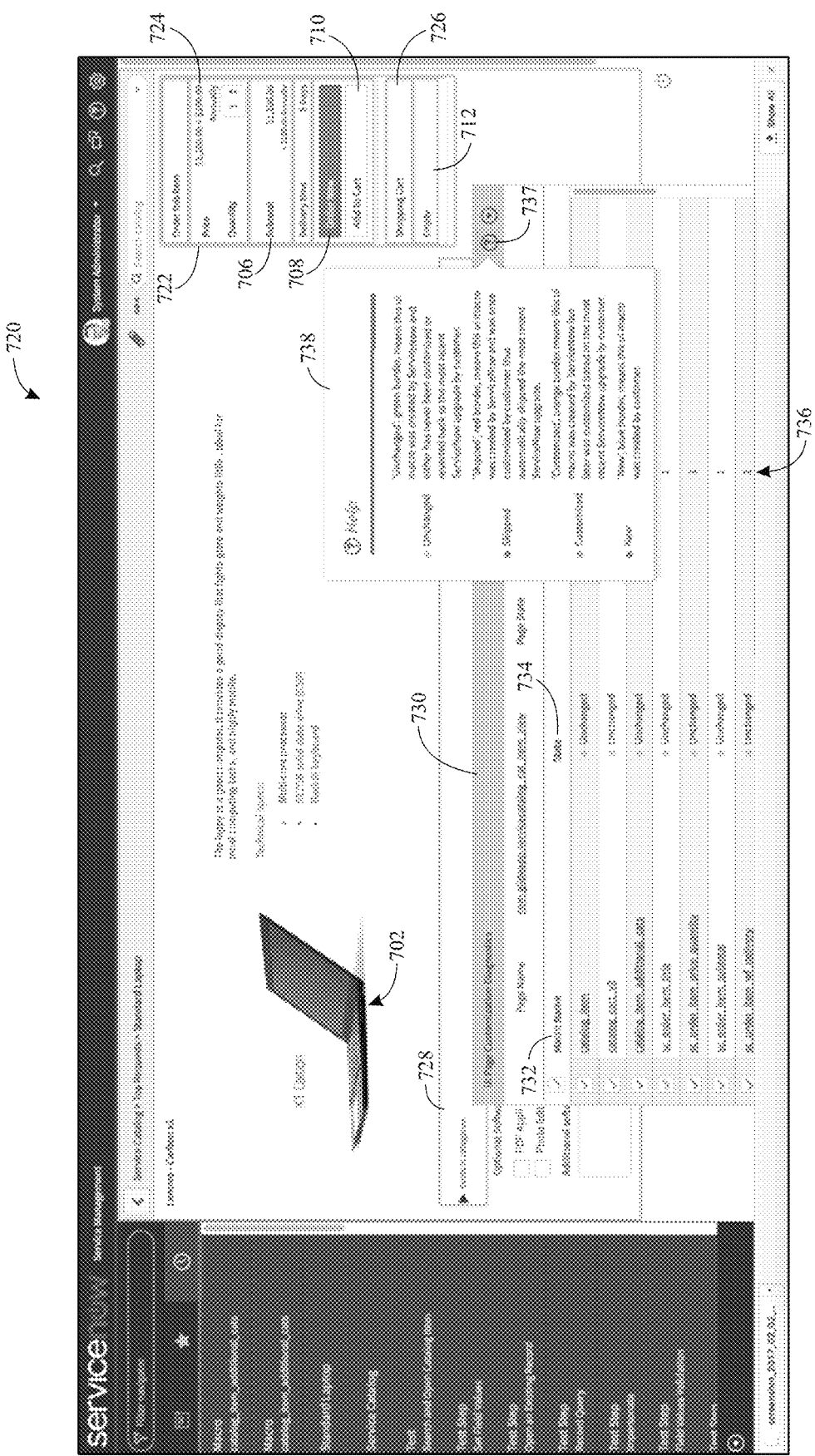
FIG. 17 is a UI macro customization interface opened on the UI of FIG. 16, in accordance with an embodiment.

The UI page 700 may provide some customizability of the goods and/or services being ordered. For example, the illustrated UI page 700 may provide an ability to add a PDF Application 714 and/or a Photo editing Application 716 to the laptop being ordered. The UI page 700 may also provide a comment section 718 to provide additional requirements (e.g., other software) that may be added to the laptop, such as productivity software. Each of these items on the UI page 700 may include numerous macros, variables, and/or customizations that may be effected when the platform 104, the service catalog, and/or service coverage under the SLA is upgraded, downgraded, and/or updated. Due to the potentially large number of these macros, variables, and/or customizations, it may be difficult to quickly determine which items may be effected by the upgrade/downgrade/update. Thus, in some embodiments, an administrator account may toggle a UI macro customization interface 720 as illustrated in FIG. 17. In some embodiments, this UI macro customization interface 720 may be disabled for end users that are not administrator accounts.

The UI macro customization interface 720 includes indicators 722, 724, 726, and 728 that surround portions of the page that call to macros, variables, and/or customizations. If the upgrade/downgrade/update has made any changes to items called in and/or used by the macros or customizations, the UI macro customization interface 720 changes the color of the effected indicators 722, 724, 726, and/or 728. If an indicator is selected, a diagnostic frame 730 is opened to indicate statuses of the macros/customizations in relation to the upgrade/downgrade/update. Each entry in the diagnostic frame 730 indicates a name 732, a state 734, and/or number of occurrences 736 of the macro/customization in the entire page and/or in the area bounded by the selected indicator. The state 734 may correspond to a color of the respective indicators in which the macro/customization is found. The selection of a help button 737 in the diagnostic frame 737 may provide help text 738 indicating how to interpret the diagnostic frame 730 and/or the UI macro customization interface 720. Selection of a specific macro in the diagnostic frame 737 may open the macro and/or provide an ability to roll the macro back to a previous version.

Figure 18:
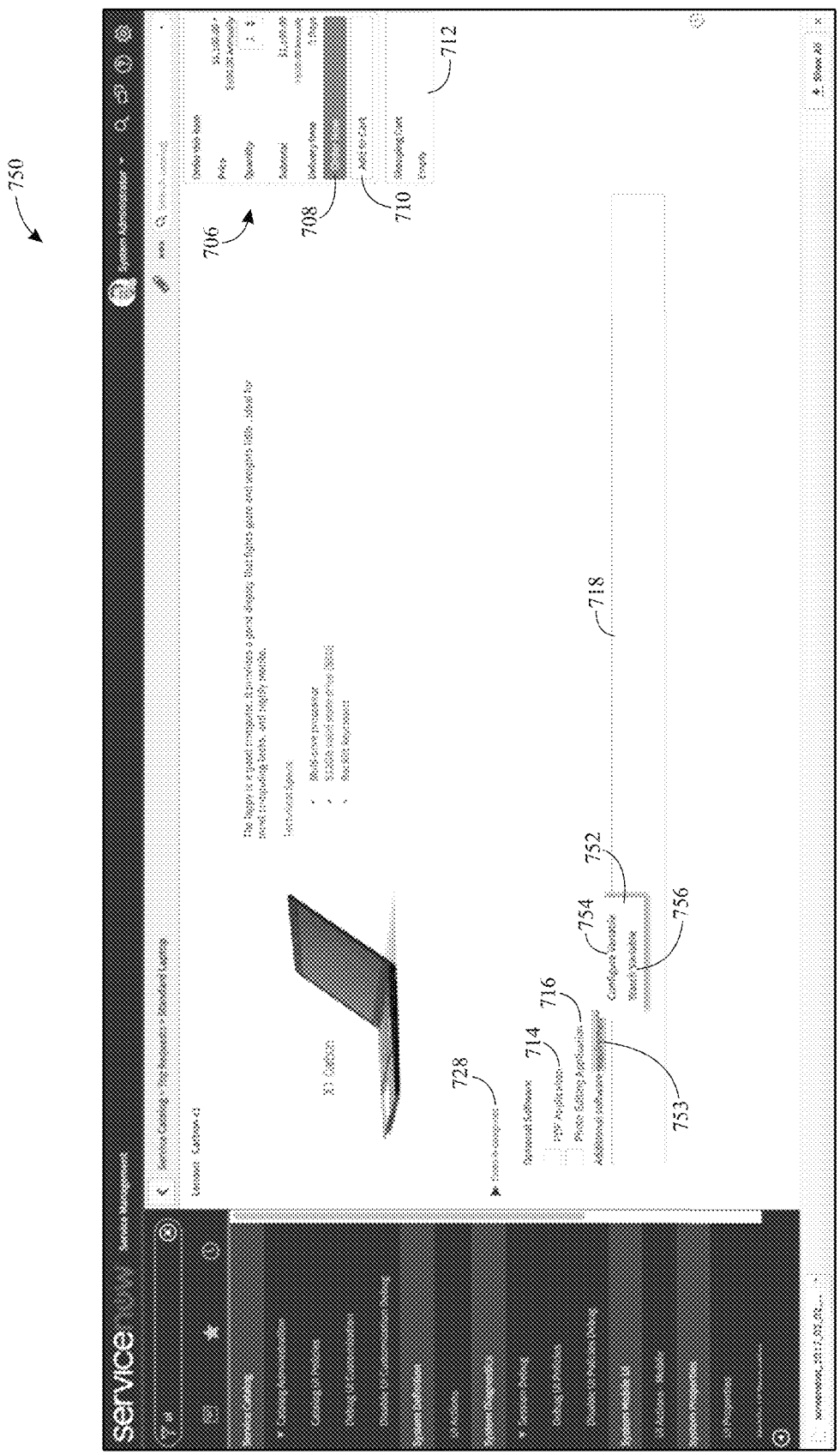
FIG. 18 is a variable watcher selector opened for a variable of the service catalog item of FIG. 16, in accordance with an embodiment.
Figure 19:
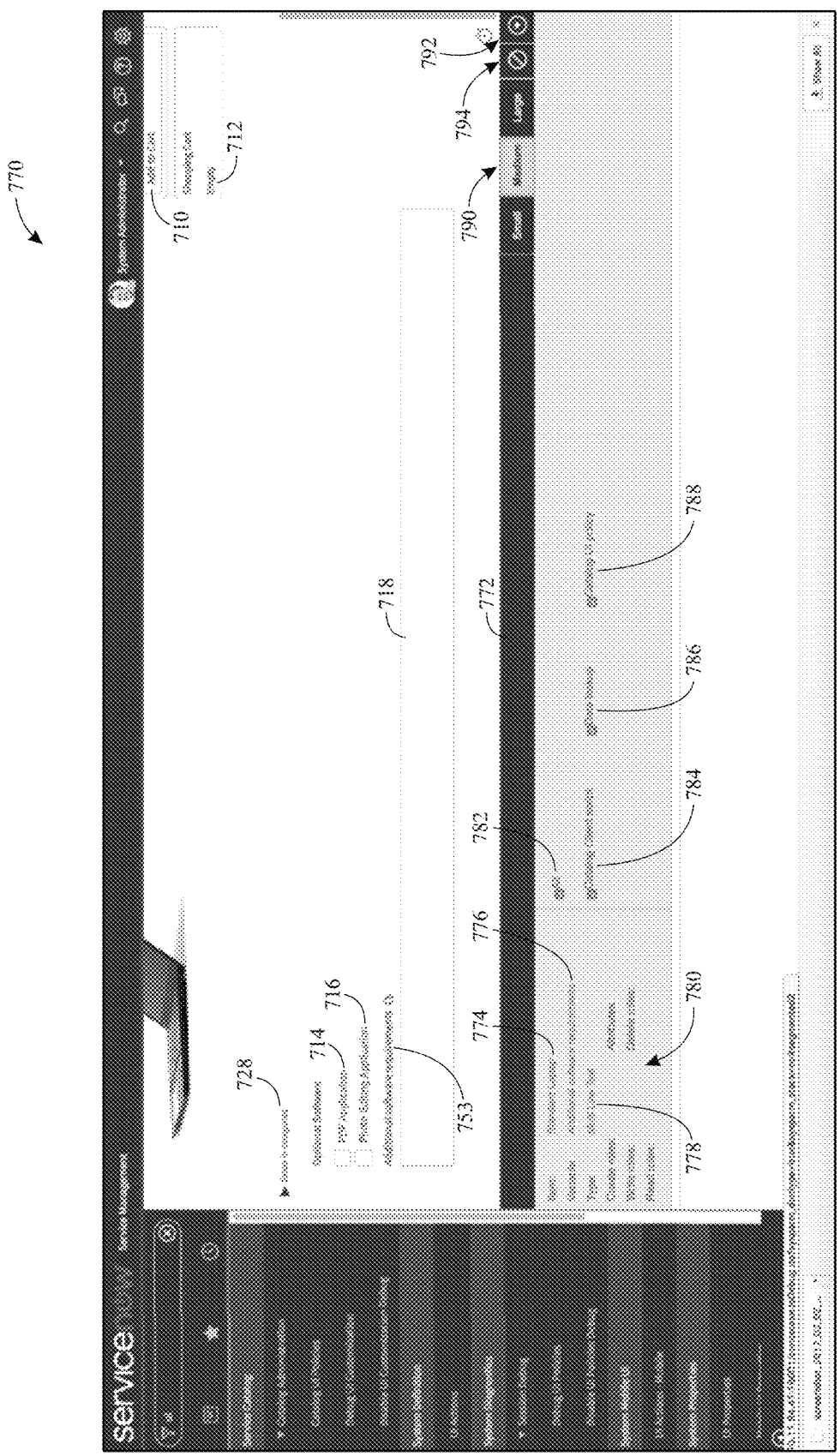
FIG. 19 is a watcher interface opened by the watcher selector of FIG. 18, in accordance with an embodiment.

In addition to or in place of the UI macro customization interface 720, the service catalog may be used to track changes to variables during navigation of page. Various different controls, such as UI policy for a page, client scripts, and/or data lookups may control various variables in a page. When a specific variable changes and/or behaves in a certain manner (e.g., becomes read-only), it may be difficult to determine why the variable is changing and/or behaving in the manner due to substantial possible mechanisms to change/effect the variable. Thus, the service catalog item may be debugged using a variable watcher. FIG. 18 illustrates a variable watcher page 750 implemented in the UI page 700. Specifically, the variable watcher page 750 opens a variable watcher selector 752 upon selection of a variable 753. The variable watcher selector 752 may include a configure variable option 754 and/or a watch variable option 756. The configure variable option 754 may provide a configuration page for the variable. The watch variable option 756 may initiate a watch session and/or invoke a watch variable interface 770, as illustrated in FIG. 19. The watch variable interface 770 includes a variable watcher frame 772 that enables customization of settings of the watch session. The watch variable interface 770 indicates a parent catalog item 774 to which the variable is invoked in the current context, a name 776 of the variable, a type 778 for the variable, and/or other various attributes 780 about the variable, such as creator roles, write roles, read roles, delete roles, and/or other attributes of the variable.

The watch variable interface 770 may also provide limitations of which interactions to track. For example, all interactions may be selected using a select all interactions radio 782, client script tracking may be toggled using a client script radio 784, data lookup change tracking may be toggled using a data lookup radio 786, and/or UI policy change tracking may be toggled using a UI policy radio 788. The watch variable interface 770 may be resized using a resize control 790 or closed using a close button 792. The watch variable interface 770 may be used to end a watch session using a close watch session button 794. Additionally or alternatively, the watch session may be ended using the variable watcher selector 752.

Figure 20:
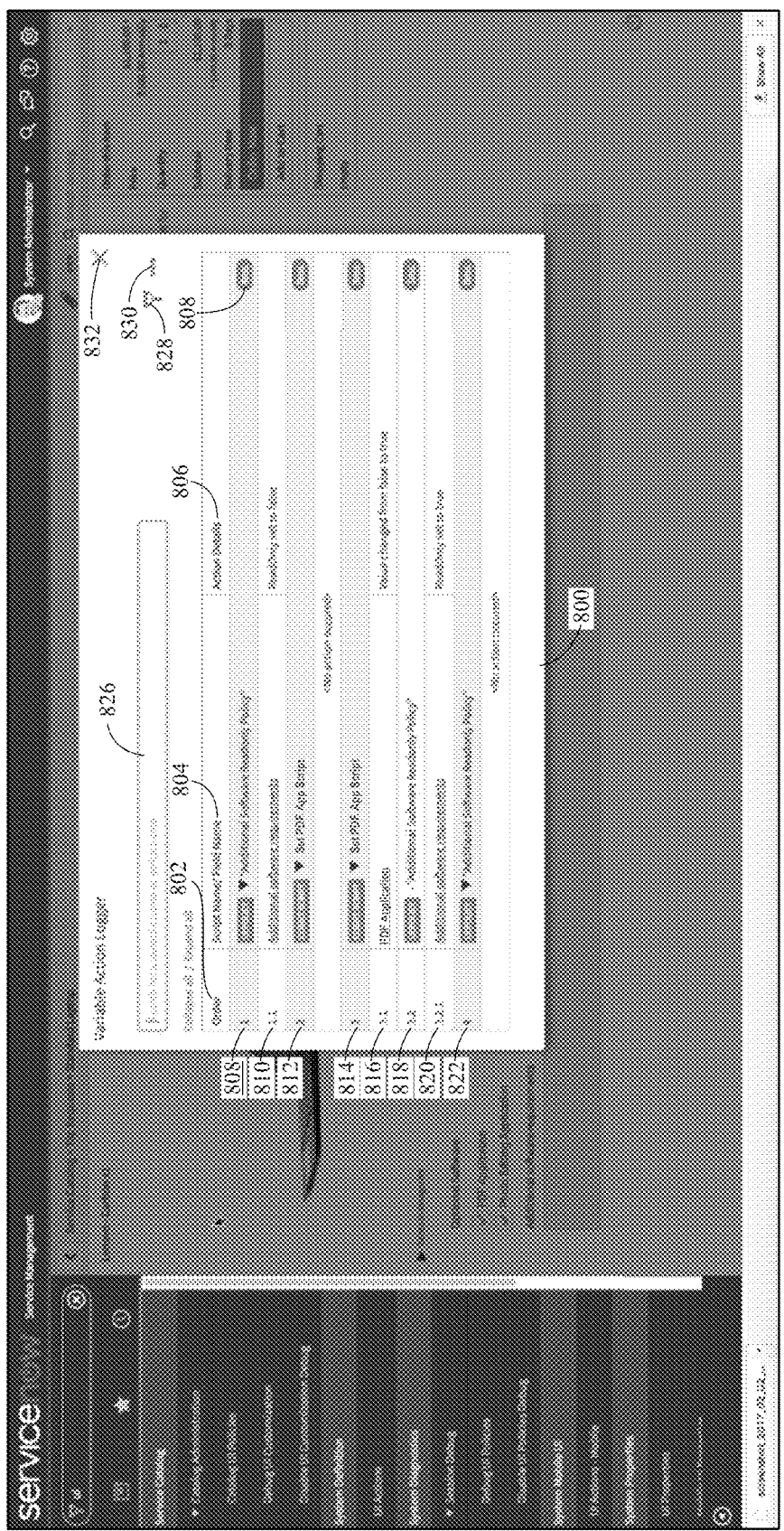
FIG. 20 is a variable log accessed via the watcher interface of FIG. 19, in accordance with an embodiment.

Once a watch session has ended, a variable action logger (VAL) frame 800, such as an embodiment of the VAL frame 800 illustrated in FIG. 20, may be opened to summarize the watch session. In some embodiments, the VAL frame 800 may be accessed while the watch session is still active. The VAL frame includes an order 802 of occurrence, name 804, details 806, and/or duration 808 for each watched event 808, 810, 812, 814, 816, 818, 820, and/or 822, collectively referred to as 808-822. The watched events 808-822 may include hierarchical events with some events (e.g., events 808, 812, 814, 822) that may include sub-events (e.g., events 810, 816, 818, and 820). This hierarchy may be seen by the order 802 for each event 802-822. The name field 804 for each event 802-822 indicates what source is making the change to the variable.

In the illustrated example, a UI Policy may be established that a selection of both the PDF application 714 and the photo editing application 716 results in a read-only state for the additional software requirements variable 753. For example, the watched additional software requirements variable changes to false for read-only at event 808 and its sub-event 810 due to a change asserted by the UI policy. A client script in sub-event 816 causes the UI policy to change the watched additional software requirements to true for read-only. Thus, if the intent is to not change the PDF_App variable using the Set PDF_App script, an administrator may ascertain that the change came from the client script and may make changes to the client script Set PDF_App accordingly.

Although the foregoing example relates to a simple example with only events 808-822, such principles may be applied to any number of events and any number of data manipulators (e.g., client scripts, UI policy, data lookups, etc.) to simplify debugging unintended behaviors in the UI page 700 instead reading tens, hundreds, or thousands of lines of code from multiple sources in an attempt to discover why a change/behavior is occurring.

FIG. 20 illustrates a process 850 for automating service catalog item testing as previously described herein. The process 850 may be operated using the ATF 420 using the application server 107. The process 850 includes receiving a test (block 852). Receiving the test may include selecting the test from multiple tests or receiving manual entry of the test via a user interface. The process 850 also obtains test step settings for a plurality of steps of the test (block 854). The step settings may be obtained through manual entry and/or pulling settings from memory according to the selected test. Once the settings are obtained, an indication may be received to execute the test (block 856). For example, the indication may include receiving a selection of a run test button. Responsive to receiving the indication, the plurality of steps is automated through step-by-step automation. These steps may be tracked using a log and/or screenshots. Also, a summary may be provided related to whether the test completed, whether the variables validated properly, and a duration of the steps/test total.

Figure 21:
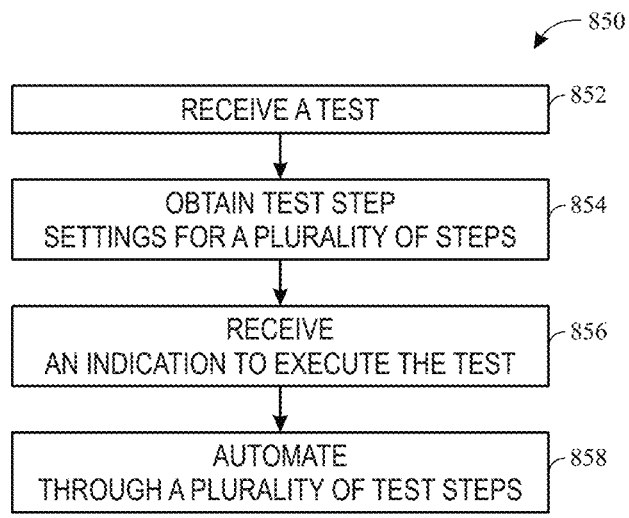
FIG. 21 is a process for automating through steps in a service catalog item, in accordance with an embodiment.
Figure 22:
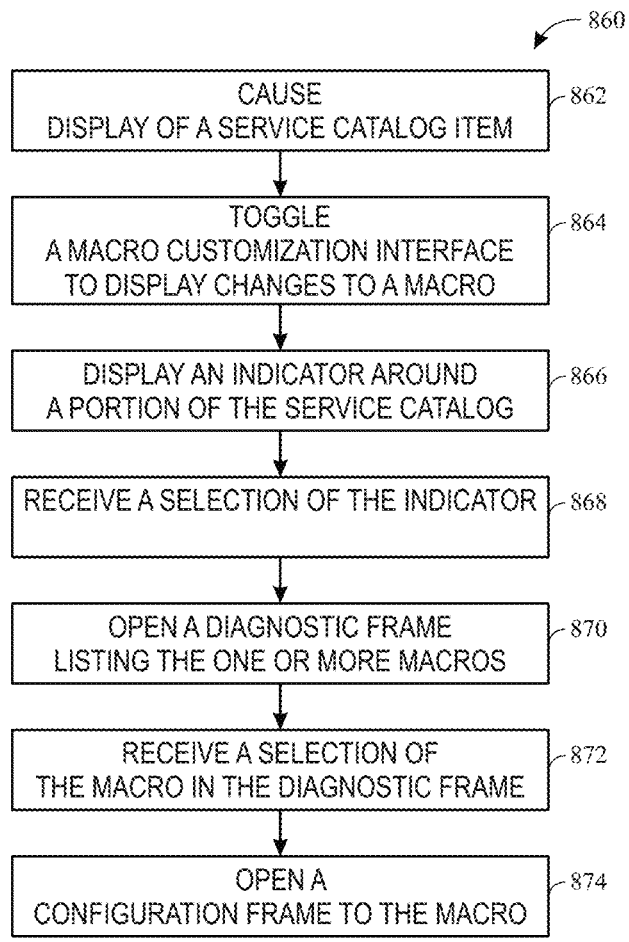
FIG. 22 is a process for indicating changes to macros in a service catalog item from changes to a platform and/or service catalog, in accordance with an embodiment.

FIG. 21 illustrates a process 860 for tracking changes to macros of service catalog item in response to changes to an operating system or service level agreement. The service catalog is displayed (block 862). A macro customization interface is activated to display changes to a macro in response to a change in the operating system of a platform running the service catalog or a change in a service level agreement (block 864). Then, an indicator is displayed around a portion of the service catalog item indicating a change to the macro that is called by or associated with the portion (block 866). The indicator indicates whether the macro has changed due to the change to the platform. A selection of the indicator is made (block 868). Responsive to the selection of the indicator, a diagnostic frame is opened listing the macro in a list of one or more macros associated with the service catalog item (block 870). The macro in the list is selected (block 872) and a configuration frame is opened for the macro (block 874). The configuration frame may be used to edit the macro or change configuration of the macro. For example, changing the configuration may include rolling back the macro to a previous version.

Figure 23:
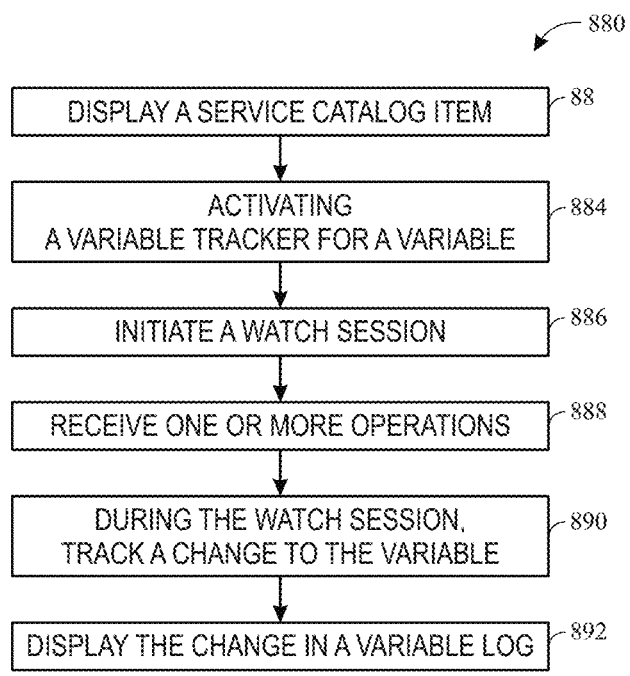
FIG. 23 is a process for tracking changes to variables in a service catalog item, in accordance with an embodiment.

FIG. 23 illustrates a process 880 used to track changes to variables in a service catalog item. The process 880 includes displaying of a service catalog item (block 882). As previously discussed, the service catalog item comprises an item presented using the service catalog that is configured to offer goods or services. The process 880 also includes activating a variable tracker for a variable of the service catalog item (block 884). Responsive to the activation of the variable tracker, a watch session to track changes to the variable is initiated (block 886). One or more operations are received in the service catalog item during the watch session (block 888). During the watch session, a change to the variable is tracked in response to the one or more operations (block 890). Tracking the change includes tracking a source (e.g., UI policy, client script, data lookup, etc.) of the change (block 892). The change is then displayed in a variable log along with an indicator of the source of the change (block 894).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   non-transitory memory; and
   one or more hardware processors configured to read instructions from the non-transitory memory to perform operations comprising:
     receiving a test having one or more steps to be executed on a service catalog item of a plurality of service catalog items, wherein the service catalog item comprises an item presented using a service catalog that is configured to offer goods or services;
     obtaining test step settings for a plurality of test steps corresponding to steps of the test, wherein the test step settings comprise variables that are entered into the service catalog item during execution of the test;
     receiving a selection of a variable of the variables through a graphic interface used to display the service catalog item to potential customers;
     receiving an indication to execute the test;
     automating through the plurality of test steps step-by-step based at least in part on the test step settings;
     responsive to the selection of the variable, initiating a watch session to track changes to the variable;
     during the watch session, tracking each change to the variable in the test; and
     displaying the change in a variable log along with an indicator of a source of the change.

2. The system of claim 1, wherein the operations comprise displaying a plurality of tests available to be run on the service catalog, wherein receiving the test comprises receiving a selection of the test from the plurality of tests.

3. The system of claim 2, wherein receiving the test comprises receiving the selection and retrieving the selected test from memory.

4. The system of claim 1, wherein the goods or services comprise information technology goods or services.

5. The system of claim 1, wherein obtaining the test step settings comprises deriving the test step settings from the received test.

6. The system of claim 1, wherein obtaining the test step settings comprises receiving the test step settings from a user interface.

7. The system of claim 6, wherein each step of the test has a menu to input corresponding test step settings for controlling execution of the test.

8. The system of claim 1, wherein automating through the plurality of test steps comprises obtaining screenshots of one or more steps of the test.

9. The system of claim 1, wherein automating through the plurality of test steps comprises displaying a step of the plurality of steps in an execution frame during automation.

10. The system of claim 1, wherein the plurality of steps comprises:
    an inputting step that inputs a variable value; and
    a validating input step that validates input of the variable value.

11. The system of claim 10, wherein the plurality of steps comprises:
    creating a record using the variable value; and
    validating the variable value in the created record.

12. The system of claim 1, wherein the operations comprise causing display of a duration indicator that is configured to indicate elapsed time from a beginning of automating through the plurality of steps and an end of automating through the plurality of steps.

13. The system of claim 1, wherein the operations comprise causing display of a duration indicator that is configured to indicate elapsed time from a beginning of a step of the plurality of steps and an end of a step of the plurality of steps during automating through the plurality of steps.

14. Non-transitory, tangible, and computer-readable medium having instructions stored thereon that, when executed by one or more processors, are configured to cause one or more processors to:
    cause display of a service catalog item, wherein the service catalog item comprises an item presented using a service catalog that is configured to offer goods or services;
    toggle a customization interface to display changes to a macro or variable after a change to a platform running the service catalog, wherein toggling the customization interface comprises receiving a selection of the macro or variable through a graphic interface used to display the service catalog item to potential customers;
    track each change to the macro or the variable after toggling the customization interface for the change to the platform;
    display an indicator around a portion of the service catalog item indicating changes to the macro or the variable that is called by or associated with the portion, wherein the indicator indicates whether the macro or the variable has changed due to the change to the platform;
    receive a selection of the indicator;
    responsive to the selection of the indicator, open a diagnostic frame listing the macro or the variable in a list of one or more macros or variables associated with the service catalog item;
    receive a selection of the macro or the variable in the diagnostic frame; and open a configuration frame for the macro or variable, wherein the configuration frame is configured to enable editing of the macro or the variable or editing of a configuration of the macro or variable.

15. The non-transitory, tangible, and computer-readable medium of claim 14, wherein the change to the platform comprises:
   an upgrade or downgrade of an operating system of the platform running the service catalog; or
   a change in a service level agreement.

16. The non-transitory, tangible, and computer-readable medium of claim 14, wherein the list of one or more macros associated with the service catalog includes macros associated with any part of the service catalog item or macros only associated with the portion.

17. The non-transitory, tangible, and computer-readable medium of claim 13, wherein editing of a configuration of the macro comprises rolling back the macro to a previous version.

18. A method for analyzing operation of a service catalog comprising:
   displaying a service catalog item, wherein the service catalog item comprises an item presented using the service catalog that is configured to offer goods or services;
   activating a variable tracker for a variable of the service catalog item, wherein activating the variable tracker comprises receiving a selection of the variable through a graphic interface used to display the service catalog item to potential customers;
   responsive to the activation of the variable tracker, initiating a watch session to track changes to the variable;
   receiving one or more operations in the service catalog item;
   during the watch session, tracking each change to the variable in response to the one or more operations, wherein tracking the change includes tracking a source of the change; and
   displaying the change in a variable log along with an indicator of the source of the change.

19. The method of claim 18, wherein the source of the change comprises a client script, a user interface policy, or a data lookup.

* * * * *